(12) United States Patent
Obai

(10) Patent No.: US 7,216,939 B2
(45) Date of Patent: May 15, 2007

(54) VEHICLE BRAKE HYDRAULIC PRESSURE CONTROL APPARATUS

(75) Inventor: Katsuo Obai, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 75 days.

(21) Appl. No.: 11/104,635

(22) Filed: Apr. 13, 2005

(65) Prior Publication Data

US 2005/0225164 A1 Oct. 13, 2005

(30) Foreign Application Priority Data

Apr. 13, 2004 (JP) .............................. 2004-118006

(51) Int. Cl.
*B60T 13/18* (2006.01)
(52) U.S. Cl. ................ 303/11; 303/DIG. 1; 303/114.3; 303/138; 303/165
(58) Field of Classification Search ............... 303/11, 303/116.1, DIG. 1, 10, 114.3, 164, 165, 138
See application file for complete search history.

(56) References Cited

U.S. PATENT DOCUMENTS 5,711,585 A * 1/1998 Tozu et al. ................. 303/146
6,679,564 B2 * 1/2004 Nitta et al. ................... 303/11

FOREIGN PATENT DOCUMENTS

JP 2003-019952 1/2003

* cited by examiner

*Primary Examiner*—Melanie Torres
(74) *Attorney, Agent, or Firm*—Buchanan Ingersoll & Rooney PC

(57) ABSTRACT

This brake hydraulic pressure control apparatus adopts, as the pressure-increasing valve, a normally-open linear solenoid valve that can linearly adjust the actual differential pressure. This apparatus repeatedly executes, in principle, a control cycle in which a pressure-reducing control, holding control and linear pressure-increasing control make one set, after ABS control start conditions are satisfied (after time t1). In this case, a pulse pressure-increasing control is executed instead of the linear pressure-increasing control only in the first-time control cycle (time t3 to t6). Then, the current value IC corresponding to the actual differential pressure at the point of starting the linear pressure-increasing control (time t8) in the second-time control cycle is estimated from the repeated number of times of the pulse pressure-increasing control by utilizing the fact that the repeated number of times becomes a value representing the current value IC corresponding to the actual differential pressure at the same point.

12 Claims, 13 Drawing Sheets

VEHICLE BRAKE HYDRAULIC PRESSURE CONTROL APPARATUS

BACKGROUND OF THE INVENTION

1. Field of the Invention

The present invention relates to a vehicle hydraulic pressure control apparatus that executes an anti-skid control (hereinafter referred to as "ABS control") for preventing an excessive slip of a wheel.

2. Description of the Related Art

Heretofore, a brake hydraulic pressure control apparatus that controls a brake hydraulic pressure in a wheel cylinder (hereinafter referred to as "wheel cylinder hydraulic pressure") to execute the ABS control has widely been mounted on vehicles. In general, the brake hydraulic pressure control apparatus is provided with a normally-open solenoid valve (pressure-increasing valve) disposed in a hydraulic circuit between a master cylinder generating a brake hydraulic pressure (hereinafter referred to as "master cylinder hydraulic pressure") according to a brake operation by a driver and the wheel cylinder and a normally-closed solenoid valve (pressure-reducing valve) disposed in a hydraulic circuit between the wheel cylinder and a reservoir, wherein the wheel cylinder hydraulic pressure can be reduced, held and increased by controlling the pressure-increasing valve and the pressure-reducing valve.

The ABS control is, in general, started in response to the establishment of predetermined ABS control start conditions, and is accomplished by performing the pressure-increasing control after the execution of the pressure-reducing control. When the ABS control start conditions are again satisfied during the pressure-increasing control in this-time ABS control, the pressure-increasing control is ended and the next ABS control is continuously started. Specifically, supposing that the period from when the ABS control start conditions are satisfied to when the next ABS control start conditions are satisfied is referred to as one control cycle, the ABS control is, in general, executed continuously plural times over plural-time control cycles.

In the brake hydraulic pressure control apparatus, a normally-open linear solenoid valve that can control a differential pressure (hereinafter referred to as "actual differential pressure") between the master cylinder hydraulic pressure and the wheel cylinder hydraulic pressure so as to be linear by linearly controlling the energizing current value has recently been adopted as the pressure-increasing valve, based upon a demand for gently increasing the wheel cylinder hydraulic pressure in the pressure-increasing control (see the following Patent Reference 1).

[Patent Reference 1] Japanese Patent Application Laid-Open (kokai) No. 2003-19952

In general, the aforesaid normally-open linear solenoid valve specifies the relationship between the energizing current value (command current) and the differential pressure (command differential pressure) corresponding to suction force by its specification. When the command differential pressure determined according to the energizing current value is greater than the actual differential pressure, the normally-open solenoid valve is closed to break the communication between the master cylinder and the wheel cylinder. On the other hand, when the command differential pressure is smaller than the actual differential pressure, the normally-open linear solenoid valve is opened to establish the communication between the master cylinder and the wheel cylinder. As a result, the brake hydraulic pressure is flown from the master cylinder into the wheel cylinder, thereby being capable of making an adjustment such that the actual differential pressure agrees with the command differential pressure.

Accordingly, in order to execute the pressure-increasing control by using the normally-open solenoid valve, at first, the energizing current value to the normally-open linear solenoid valve (i.e., pressure-increasing valve) is immediately set to the current value (i.e., the energizing current value in order to match the command differential pressure to the actual differential pressure; hereinafter referred to as "current value corresponding to the actual differential pressure") at the point of starting the pressure-increasing control with the pressure-reducing valve maintained in its closed state. With this state, the energizing current value is gradually decreased, resulting in that the actual differential pressure is gradually decreased. This can gently increase the wheel cylinder hydraulic pressure over the pressure-increasing control.

In other words, in order to gently increase the wheel cylinder hydraulic pressure from the point of starting the pressure-increasing control, it is necessary to correctly obtain the current value corresponding to the actual differential pressure (accordingly, the actual differential pressure at this point) at the point of starting the pressure-increasing control (or before this point). The actual differential pressure can easily be detected by using both a sensor detecting the master cylinder hydraulic pressure and a sensor detecting the wheel cylinder hydraulic pressure. However, using these two sensors is generally difficult to be adopted, since there arises a problem of increasing production cost and a problem of being difficult to secure reliability of the sensors.

From the above, it is necessary to obtain the actual differential pressure (or current value corresponding to the actual differential pressure) at the point of starting the pressure-increasing control without utilizing these sensors. Therefore, the brake hydraulic pressure control apparatus disclosed in the Patent Reference 1 obtains the current value corresponding to the actual differential pressure during the pressure-increasing control in the first-time control cycle (first-time ABS control), and based upon this value, obtains the current value corresponding to the actual differential pressure at the point of starting the pressure-increasing control in the second-time and the following control cycles. This technique will be more specifically explained hereinafter with reference to FIG. 14.

FIG. 14 is a time chart showing one example of a change in wheel speed Vw, (estimated) vehicle body speed Vso, master cylinder hydraulic pressure Pm, wheel cylinder hydraulic pressure Pw and command current value Id (i.e., energizing current value) to the pressure-increasing valve that is the linear solenoid valve, in case where a driver of a vehicle having mounted thereto the brake hydraulic pressure control apparatus executing the above-mentioned technique continuously executes the brake operation from a certain point before time t1 and the ABS control start conditions are satisfied at time t1 and time t4 (i.e., in case where the period from time t1 to time t4 corresponds to the first-time control cycle and the period after time t4 corresponds to the second-time control cycle).

As shown in FIG. 14, this apparatus starts the pressure-reducing control simultaneous with the start of the first-time ABS control at time t1, and when predetermined holding control start conditions are satisfied during this pressure-reducing control, executes the holding control after the pressure-reducing control. Thereafter, since predetermined pressure-increasing control start conditions are satisfied upon having reached time t2, this apparatus sets the command current value Id to a predetermined value at time t2 and gradually decreases the command current value Id in the period from time t2 to time t4, thereby executing the pressure-increasing control.

In this example, the command current value Id is greater than the current value corresponding to the actual differential pressure (i.e., the command differential pressure is greater than the actual differential pressure) during the period from time t2 to time t3, that means the linear solenoid valve is maintained in its closed state. Accordingly, the wheel cylinder hydraulic pressure Pw becomes constant during this period. Upon having reached time t3, the command current value Id agrees with the current value corresponding to the actual differential pressure, so that the linear solenoid valve is opened and the wheel cylinder hydraulic pressure Pw is increasing according to the decrease in the command current value Id during the period from time t3 to time t4. In other words, the command current value Id keeps on agreeing with the current value corresponding to the actual differential pressure during the period from time t3 to time t4. Thus, this apparatus can correctly obtain the current value Idc corresponding to the actual differential pressure at time t4 that is the point of ending the pressure-increasing control.

Subsequently, this apparatus again starts and executes the pressure-reducing control simultaneous with the start of the second-time ABS control at time t4. At this time, this apparatus obtains, by a predetermined technique, a current value ΔIrdc corresponding to the reduced pressure that corresponds to the actual differential pressure increased with the decrease in the wheel cylinder hydraulic pressure during this pressure-reducing control. The current value ΔIrdc corresponding to the reduced pressure can be obtained, for example, as the product of the pressure-reducing control continuation time by a predetermined coefficient.

After executing the holding control after this pressure-reducing control and upon having reached time t5 that is the point when the pressure-increasing control start conditions are satisfied, this apparatus sets the command current value Id to a value ID (ID=Idc+ΔIrdc) obtained by adding the aforesaid "current value ΔIrdc corresponding to the reduced pressure" to the aforesaid "current value Idc corresponding to the actual differential pressure at time t4". Here, this value ID agrees with the current value corresponding to the actual differential pressure at time t5 (i.e., at the point of starting the pressure-increasing control in the second-time control cycle). Therefore, the command current value Id keeps on correctly agreeing with the current value corresponding to the actual differential value even in the pressure-increasing control executed after time t5, like the previous period from time t3 to time t4, with the result that the current value corresponding to the actual differential value at the point of starting the pressure-increasing control in the third-time and the following control cycles can also be successively and correctly obtained like the aforesaid value ID.

In this manner, this apparatus correctly obtains the current value corresponding to the actual differential pressure at the point of ending the pressure-increasing control (i.e., at the point of ending the first-time pressure-increasing control) by utilizing the fact that the command current value Id keeps on agreeing with the current value corresponding to the actual differential pressure during the period from a certain point during the pressure-increasing control in the first-time control cycle to the point of ending the pressure-increasing control, and based upon this value, this apparatus can correctly obtain the current value corresponding to the actual differential pressure at the point of starting the pressure-increasing control in the second-time and the following control cycles.

However, in case where the actual differential pressure becomes extremely great at the point of starting the pressure-increasing control in the first-time control cycle, there may be the case where the command current value Id does not agree with the current value corresponding to the actual differential pressure during the pressure-increasing control. Specifically, in case where a driver performs a rapid and strong brake operation (i.e., for example, the brake operation wherein brake operation force is rapidly increased over a relatively long period even after the ABS control start conditions are satisfied at time t1 as shown in FIG. 15), the actual differential pressure becomes sufficiently greater than the command differential pressure according to the command current value Id at the point of starting the first-time pressure-increasing control (time t2), whereby the linear solenoid valve that is the pressure-increasing valve is brought into its open state to rapidly decrease the actual differential pressure toward the command differential pressure according to the command current value Id (i.e., to rapidly decrease the current value corresponding to the actual differential pressure toward the command current value Id) after time t2. It should be noted that times t1, t2, t4' and t5' in FIG. 15 respectively correspond to times t1, t2, t4 and t5 in FIG. 14.

Thus, the wheel cylinder hydraulic pressure Pw is rapidly increased. At this time, the actual differential pressure becomes extremely great, so that the wheel cylinder hydraulic pressure Pw reaches a value sufficiently great to such a degree that the ABS control start conditions are satisfied, before the current value corresponding to the actual differential pressure reaches the command current value Id as decreasing. As a result, the first-time pressure-increasing control is ended with the state where the current value corresponding to the actual differential pressure Id is maintained to be great at time t4' that is earlier than time t4 in FIG. 14.

In this case, the value obtained by this apparatus as the current value Idc' corresponding to the actual differential pressure at time t4' (i.e., at the point of ending the first-time pressure-increasing control) becomes smaller than the current value corresponding to the actual differential pressure at the actual time t4', so that the value obtained by this apparatus as the current value ID' corresponding to the actual differential pressure at time t5' (i.e., at the point of starting the second-time pressure-increasing control) also becomes smaller than the current value corresponding to the actual differential pressure at the actual time t5'.

Specifically, in this case, the current value corresponding to the actual differential pressure at the point of starting the pressure-increasing control in the second-time control cycle cannot correctly be obtained. The current value corresponding to the actual differential pressure at the point of starting the pressure-increasing control can correctly be obtained from the point of starting the pressure-increasing control in the control cycle next to the point when the command current value Id agrees with the current value corresponding to the actual differential pressure in the second-time or following pressure-increasing control cycle.

In other words, in case where a driver performs a rapid and strong brake operation, the brake hydraulic pressure control apparatus disclosed in the Patent Reference 1 takes much time to correctly obtain the current value corresponding to the actual differential pressure, thereby entailing a problem that the correct and gentle pressure-increasing control utilizing the linear solenoid valve cannot be started at an earlier stage.

SUMMARY OF THE INVENTION

The present invention is accomplished in view of the above-mentioned problem, and aims to provide a vehicle brake hydraulic pressure control apparatus executing an ABS control using a linear solenoid valve as a pressure-increasing control valve, wherein, in case where a driver performs a rapid and strong brake operation, a current value corresponding to the actual differential pressure can correctly be obtained in a relatively short period without using sensors for detecting a master cylinder hydraulic pressure and wheel cylinder hydraulic pressure.

The feature of the present invention is that a brake hydraulic pressure control apparatus that is applied to a control unit provided with a pressure-increasing valve that is a linear solenoid valve and a pressure-reducing valve that can be at least opened and closed in response to an energizing current value, and that is provided with ABS control means that, by controlling the energizing current value to the pressure-increasing valve and the energizing current value to the pressure-reducing valve, can continuously execute plural times an ABS control, that is started in response to the establishment of predetermined ABS control start conditions, in which ABS control a pressure-increasing control for increasing the wheel cylinder hydraulic pressure is executed until the ABS control start conditions are next satisfied after a pressure-reducing control for reducing the wheel cylinder hydraulic pressure is executed, this brake hydraulic pressure control apparatus comprising differential pressure estimating means for estimating a value representing a degree of the differential pressure (i.e., actual differential pressure) in a predetermined-numberth-time ABS control by a calculation and means for obtaining energizing current value at the point of starting the pressure-increasing control, this means obtaining an energizing current value to the pressure-increasing valve corresponding to the differential pressure at the point of starting the pressure-increasing control in the ABS control that is successively executed next to the predetermined-numberth-time ABS control, based upon the value representing the degree of the differential pressure, wherein the ABS control means sets the energizing current value to the pressure-increasing valve at the point of starting the pressure-increasing control in the ABS control next to the predetermined-numberth-time ABS control to the energizing current value obtained by the means for obtaining energizing current value at the point of starting the pressure-increasing control.

Here, it is preferable that the pressure-increasing valve is a normally-open linear solenoid valve (a linear solenoid valve that is brought into its open state when the energizing current value is "0"). Further, the pressure-reducing valve may be either one of (normally-closed) solenoid on-off valve (a solenoid valve that is brought into its open state or closed state according to the energizing current value) or (normally-closed) linear solenoid valve. Further, in the ABS control, a holding control may be executed between the pressure-reducing control and the pressure-increasing control. Moreover, in the ABS control, the pressure-reducing control may be at first executed or holding control may be at first executed in response to the establishment of the ABS control start conditions. Further, the ABS control start conditions that are start conditions of each control cycle may be the same every control or may be different from every control.

According to this, the value representing the degree of the actual differential pressure during the predetermined-numberth-time ABS control (alternately, during the pressure-increasing control in the predetermined-numberth-time ABS control) can be estimated by calculation, whereby the degree of the actual differential pressure at the point of ending the predetermined-numberth-time pressure-increasing control (i.e., at the point of starting the ABS control next to the predetermined-numberth-time ABS control) can precisely be obtained even if a driver performs a rapid and strong brake operation (i.e., even if the actual differential pressure during the predetermined-numberth-time pressure-increasing control is extremely great).

Further, as described above, the current value corresponding to the reduced pressure corresponding to the actual differential pressure increased with the decrease in the wheel cylinder hydraulic pressure during the pressure-reducing control in the ABS control next to the predetermined-numberth-time ABS control can be obtained by a known predetermined technique. From the above, the means for obtaining the energizing current value at the point of starting the pressure-increasing control can immediately obtain the current value corresponding to the actual differential pressure at the point of starting the pressure-increasing control in the ABS control next to the predetermined-numberth-time ABS control with high precision based upon the value representing the degree of the actual differential pressure (and the current value corresponding to the reduced pressure). In other words, even in case where a driver performs a rapid and strong brake operation, the current value corresponding to the actual differential pressure can correctly be obtained in a relatively short period without using sensors for detecting the master cylinder hydraulic pressure and wheel cylinder hydraulic pressure.

By the ABS control means, the energizing current value to the pressure-increasing valve (i.e., linear solenoid valve) at the point of starting the pressure-increasing control in the ABS control next to the predetermined-numberth-time ABS control is set to the current value corresponding to the actual differential pressure obtained by the means for obtaining the energizing current value at the point of starting the pressure-increasing control. As a result, the wheel cylinder hydraulic pressure can gently be increased over each pressure-increasing control in the ABS control next to the predetermined-numberth-time ABS control and the ABS control repeatedly executed after that.

In this case, it is preferable that the first-time ABS control is used as the predetermined-numberth-time ABS control. This allows the current value corresponding to the actual differential pressure to be immediately obtained with high precision at the point of starting the pressure-increasing control in the second-time ABS control. Therefore, the gentle pressure-increasing control of the wheel cylinder hydraulic pressure using the linear solenoid valve as the pressure-increasing valve can be started at an earlier stage (specifically, at the point of starting the second-time pressure-increasing control), whereby the appropriate and gentle ABS control can be started at an earlier stage.

In any one of the brake hydraulic pressure control apparatuses according to the present invention, the differential pressure estimating means is preferably configured to cause, in the predetermined-numberth-time pressure-increasing control, the ABS control means to control the energizing current value to the pressure-increasing valve and the energizing current value to the pressure-reducing valve such that, by maintaining the pressure-increasing valve in its open state for a predetermined pressure-increasing time and then in its closed state for a predetermined holding time with the pressure-reducing valve maintained in its closed state, a pulse pressure-increasing control increasing or holding the wheel cylinder hydraulic pressure is continuously executed until the ABS control start conditions are next satisfied and is configured to use the number of times of the pulse pressure-increasing control executed in the predetermined-numberth-time pressure-increasing control as the value representing the degree of the differential pressure.

In case where the pulse pressure-increasing control is repeatedly performed during the pressure-increasing control in the predetermined-numberth-time ABS control (i.e., in case where the actual differential pressure occurs), the wheel cylinder hydraulic pressure is pulsewise increased so as to correspond to each pressure-increasing time. Each increasing amount of the wheel cylinder hydraulic pressure is determined by the actual differential pressure at the point of starting the corresponding pressure-increasing control. As a result, all of each increasing amount of the wheel cylinder hydraulic pressure during the pulse pressure-increasing control can be values determined by the actual differential pressure at the point of starting the first-time pressure-increasing control (i.e., at the point of starting the pressure-increasing control in the predetermined-numberth-time ABS control). Therefore, the greater the actual differential pressure at the point of starting the pressure-increasing control in the predetermined-numberth-time ABS control becomes, the greater the values become.

Accordingly, the number of times of the pulse pressure-increasing control required for the wheel cylinder hydraulic pressure to reach the value sufficiently great to such a degree for satisfying the ABS control start conditions next to the predetermined-numberth-time ABS control from the value at the point of starting the pressure-increasing control in the predetermined-numberth-time ABS control becomes small as the actual differential pressure at the point of starting the pressure-increasing control in the predetermined-numberth-time ABS control is great. Therefore, the degree of the actual differential pressure at the point of starting the pressure-increasing control in the predetermined-numberth-time ABS control can precisely be obtained from the number of times of the pulse pressure-increasing control, whereby the actual differential pressure at the point of ending the predetermined-numberth-time pressure-increasing control (i.e., at the point of starting the ABS control next to the predetermined-numberth-time ABS control) can also be precisely obtained from the degree of this actual differential pressure and the number of times of the pulse pressure-increasing control.

In other words, the number of times of the pulse pressure-increasing control can be a value precisely representing the degree of the actual differential pressure in the predetermined-numberth-time ABS control (specifically, the pressure-increasing control in the predetermined-numberth-time ABS control). From the above, by the configuration wherein the number of times of the pulse pressure-increasing control executed in the predetermined-numberth-time pressure-increasing control is used as the value representing the degree of the differential pressure (actual differential pressure), the current value corresponding to the actual differential pressure at the point of starting the pressure-increasing control in the ABS control next to the predetermined-numberth-time ABS control can precisely be obtained, regardless of whether a driver performs a rapid and strong brake operation, by executing the pulse pressure-increasing control (instead of the pressure-increasing control for gently increasing the wheel cylinder hydraulic pressure) with respect to only the pressure-increasing control in the predetermined-numberth-time ABS control (preferably the first-time ABS control).

It is preferable that the brake hydraulic pressure control apparatus according to the present invention executing the pulse pressure-increasing control as described above is further provided with holding time changing means that obtains a value representing a degree of increase in the slip amount of a wheel during the predetermined-numberth-time pressure-increasing control (i.e., during the pulse pressure-increasing control) and changes the predetermined holding time according to the value representing the degree of the increase in the slip amount of the wheel. Here, the value representing the degree of the increase in the slip amount of the wheel is, for example, a degree of the increase in the slip amount of the wheel at each point of starting the pressure-increasing control in the pulse pressure-increasing control, and more specifically, a difference between the slip amount of the wheel at the point of starting this-time pressure-increasing control and the slip amount of the wheel at the point of starting the last-time (the first one before this-time pressure-increasing control) pressure-increasing control during the pulse pressure-increasing control, but not limited thereto.

In general, a predetermined optimum value is present in the upgrade of the wheel cylinder hydraulic pressure during the pressure-increasing control in the ABS control. The (average) upgrade of the wheel cylinder hydraulic pressure during the pulse pressure-increasing control can be adjusted by changing the ratio of the pressure-increasing time and the holding time. Accordingly, in case where the upgrade of the wheel cylinder hydraulic pressure during the pulse pressure-increasing control is different from the predetermined optimum value, the upgrade can be agreed with the optimum value by adjusting the ratio.

When the pressure-increasing time is changed in order to change the ratio of the pressure-increasing time and the holding time, the increasing amount of the wheel cylinder hydraulic pressure in the pressure-increasing time is changed. As a result, the number of times of the pulse pressure-increasing control that is the value representing the degree of the actual differential pressure is also changed, whereby the current value corresponding to the actual differential pressure cannot precisely be obtained. Therefore, it is necessary to change the holding time in order to change the ratio of the pressure-increasing time and the holding time.

On the other hand, the degree of the increase in the slip amount of the wheel (that is the subject for the ABS control) in the pressure-increasing control is increased as the upgrade of the wheel cylinder hydraulic pressure during the pressure-increasing control in the ABS control is increased. In other words, the value representing the degree of the increase in the slip amount of the wheel during the pressure-increasing control (accordingly, during the pulse pressure-increasing control) in the ABS control can be a value precisely representing the upgrade of the wheel cylinder hydraulic pressure.

From the above, by the configuration wherein the holding time is changed according to the value representing the degree of the increase in the slip amount of the wheel, the upgrade can be agreed with (or can get close to) the predetermined optimum value by increasing the holding time, in case where the degree of the increase in the slip amount of the wheel is great (i.e., in case where the upgrade of the wheel cylinder hydraulic pressure is great), for example. As a result, an optimum pulse pressure-increasing control based upon the optimum upgrade of the wheel cylinder hydraulic pressure can be executed.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
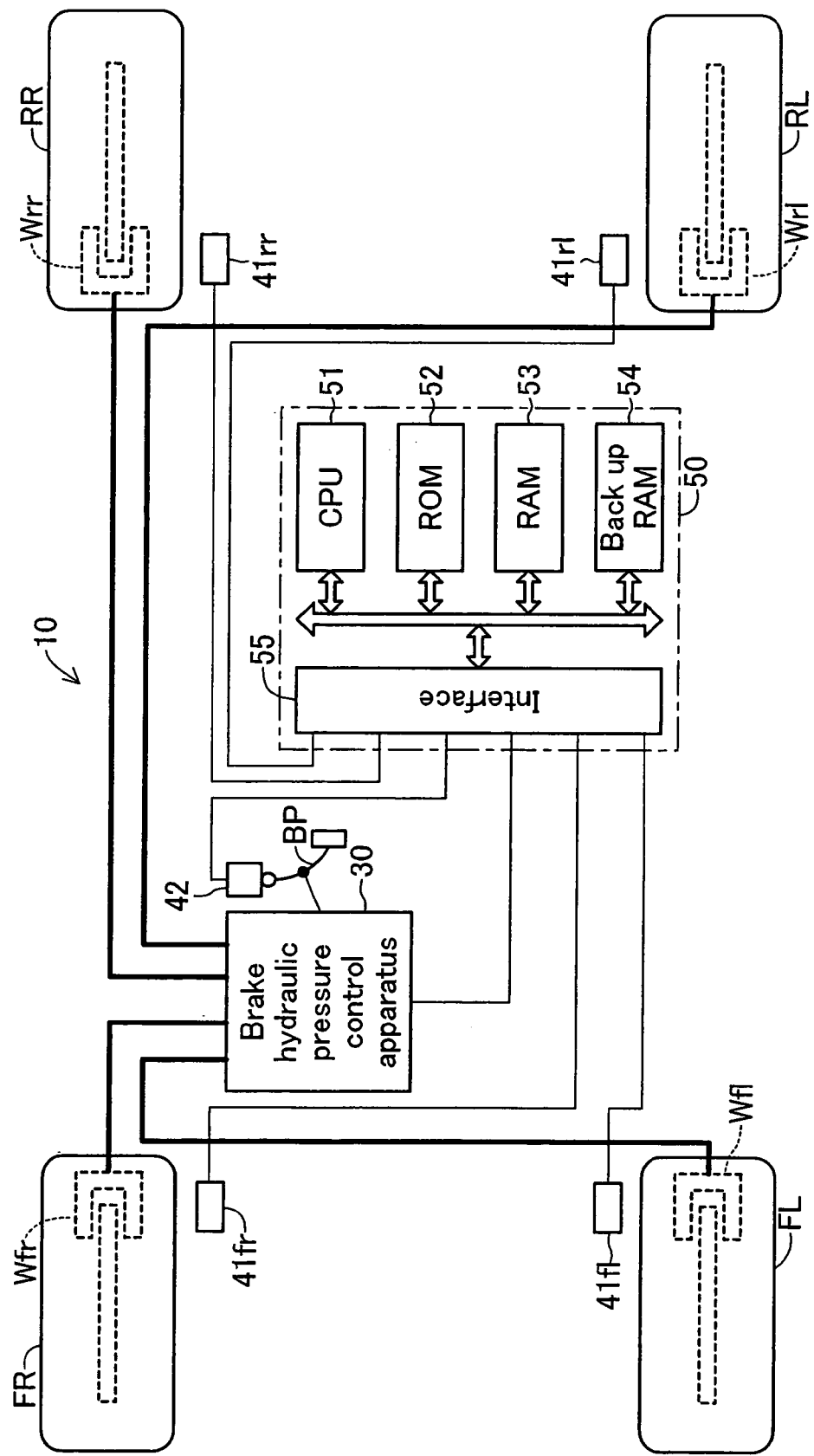
FIG. 1 is a schematic diagram of a vehicle equipped with a vehicle motion control apparatus including a brake hydraulic pressure control apparatus according to an embodiment of the present invention.

An embodiment of the present invention will be described with reference to the drawings. FIG. 1 schematically shows the structure of a vehicle equipped with a vehicle motion control apparatus 10 including a brake hydraulic pressure control apparatus according to the present embodiment. The illustrated vehicle is a four-wheel, rear-wheel drive (FR) vehicle having two front wheels (a front left wheel FL and a front right wheel FR), which are non-drive wheels (follower wheels), and two rear wheels (a rear left wheel RL and a rear right wheel RR), which are drive wheels.

Figure 2:
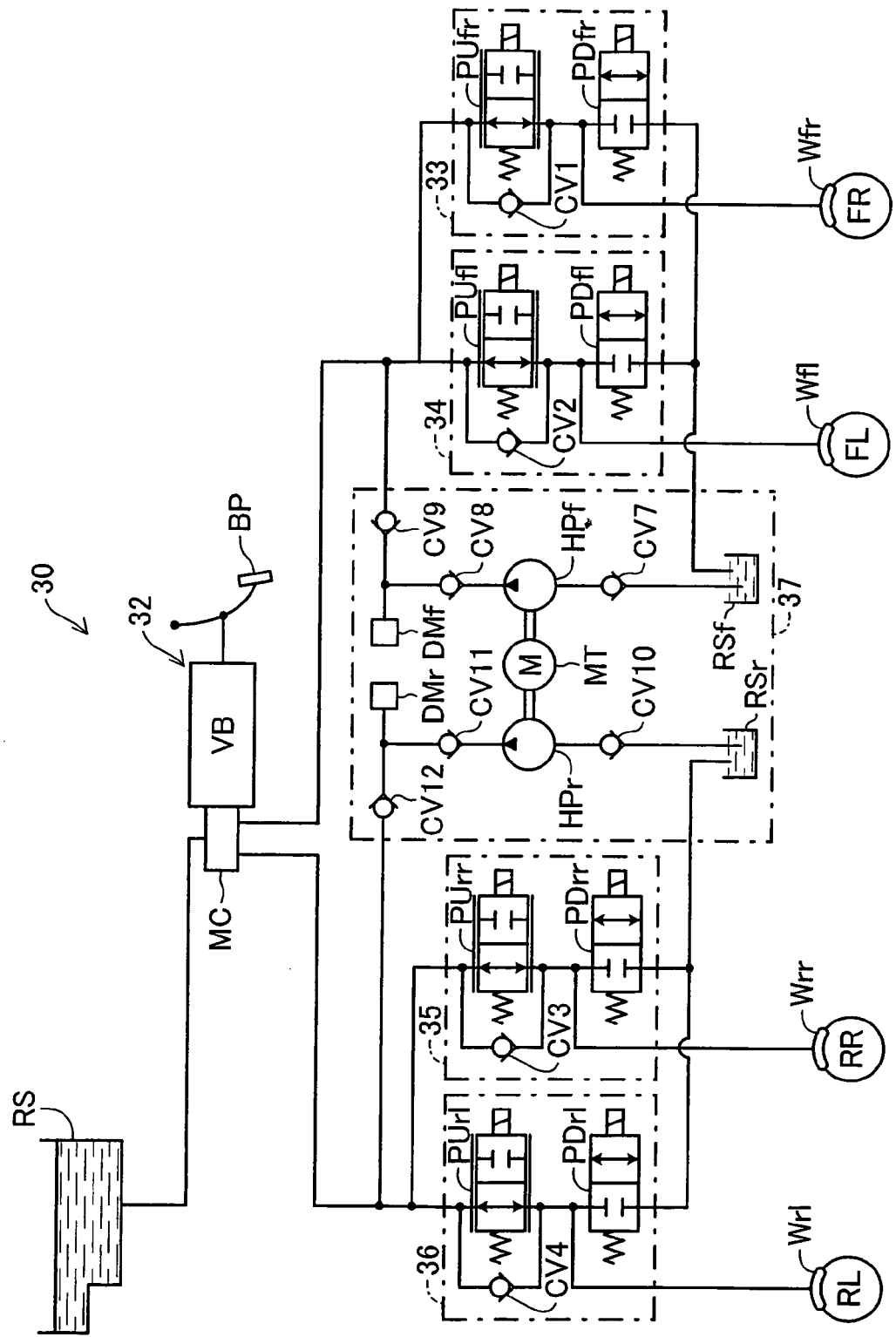
FIG. 2 is a schematic diagram of a brake hydraulic pressure control apparatus shown in FIG. 1.

This vehicle motion control apparatus 10 includes a brake hydraulic pressure control apparatus 30 for generating braking force in each wheel by means of brake hydraulic pressure. As schematically shown in FIG. 2, the brake hydraulic pressure control apparatus 30 includes a brake hydraulic pressure generating section 32 which generates brake hydraulic pressure corresponding to the operating force of a brake pedal BP; an FR brake hydraulic pressure adjusting section 33, an FL brake hydraulic pressure adjusting section 34, an RR brake hydraulic pressure adjusting section 35, and an RL brake hydraulic pressure adjusting section 36, which can adjust the brake hydraulic pressures supplied to corresponding wheel cylinders Wfr, Wfl, Wrr, and Wrl respectively installed on the wheels FR, FL, RR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within an intake pipe of an unillustrated engine so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure corresponding to the boosted operating force. The master cylinder MC also generates from the second port a second master cylinder hydraulic pressure which is substantially the same as the first master cylinder hydraulic pressure and which corresponds to the boosted operating force. The structures and operations of the master cylinder MC and the vacuum booster VB are well known, and therefore an explanation of the details thereof will be omitted. In this manner, the master cylinder MC and the vacuum booster VB (brake hydraulic pressure generating means) generate first and second master cylinder hydraulic pressures corresponding to the operating force of the brake pedal BP.

The first port of the master cylinder MC is connected to the upstream side of the FR brake hydraulic pressure adjusting section 33 and the upstream side of the FL brake hydraulic pressure adjusting section 34. Similarly, the second port of the master cylinder MC is connected to the upstream side of the RR brake hydraulic pressure adjusting section 35 and the upstream side of the RL brake hydraulic pressure adjusting section 36. Thus, the first master cylinder hydraulic pressure is supplied to the upstream side of the FR brake hydraulic pressure adjusting section 33 and the upstream side of the FL brake hydraulic pressure adjusting section 34, and the second master cylinder pressure is supplied to the upstream side of the RR brake hydraulic pressure adjusting section 35 and the upstream side of the RL brake hydraulic pressure adjusting section 36.

The FR brake hydraulic pressure adjusting section 33 consists of a pressure-increasing valve PUfr, which is a normally-open linear solenoid valve, and a pressure-reducing valve PDfr, which is a normally-closed solenoid on-off valve of a 2-port, 2-position type. When the pressure-reducing valve PDfr is in its closed state (in a position in a non-excited (OFF) state) as shown in FIG. 2, it breaks the communication between the wheel cylinder Wfr and the reservoir RSf, while when it is in its open state (in a position in an excited (ON) state), it establishes communication between the wheel cylinder Wfr and the reservoir RSf.

Force in the open direction based upon the urging force from an unillustrated coil spring is normally exerted on the valve body of the pressure-increasing valve PUfr, and force in the open direction based upon the differential pressure between the master cylinder hydraulic pressure and the wheel cylinder hydraulic pressure (hereinafter simply referred sometimes to as "actual differential pressure") and force in the closing direction based upon suction force that proportionally increases in accordance with an energizing current value (accordingly, command current value Id) to the pressure-increasing valve PUfr are exerted on the valve body of the pressure-increasing valve PUfr.

Figure 3:
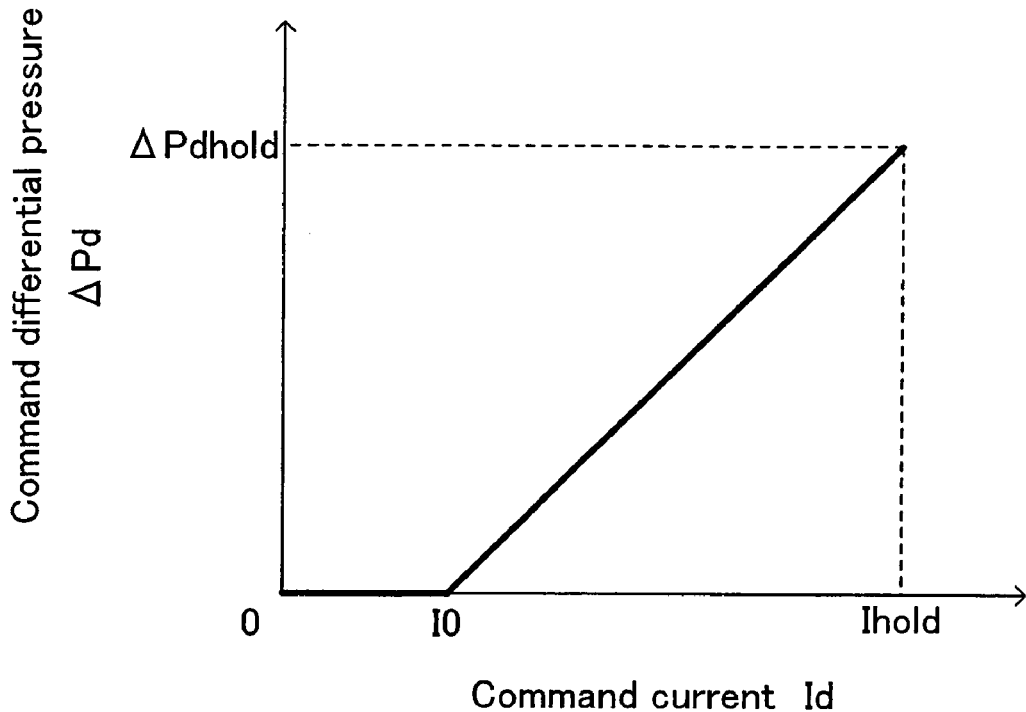
FIG. 3 is a graph showing a relationship between a command current and command differential pressure for the pressure-increasing valve shown in FIG. 2.
Figure 4:
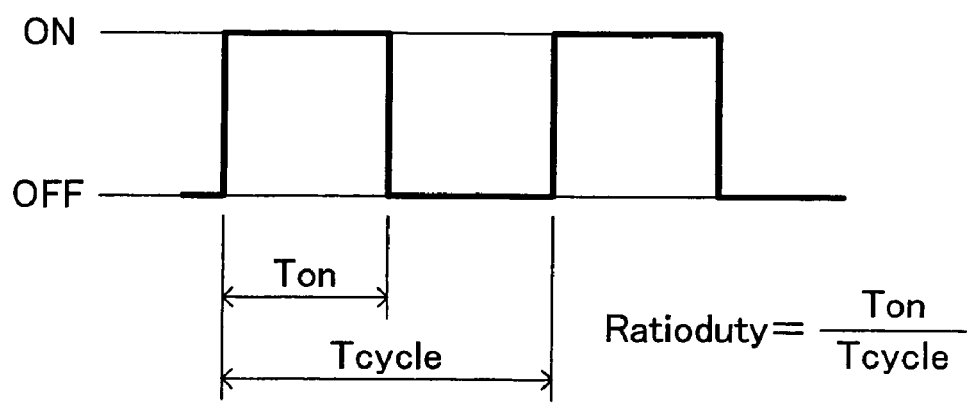
FIG. 4 is a view showing an energizing pattern upon controlling the command current shown in FIG. 3 with a duty control.

As a result, it is determined such that the command differential pressure ΔPd corresponding to the suction force is proportionally increased in accordance with the command current value Id as shown in FIG. 3. Here, I0 is a current value corresponding to the urging force of the coil spring. When the command differential pressure ΔPd is greater than the actual differential pressure (i.e., when the command current value Id is greater than the current value corresponding to the actual differential pressure), the pressure-increasing valve PUfr is closed to break the communication between the upstream side of the FR brake hydraulic pressure adjusting section 33 and the wheel cylinder Wfr. On the other hand, when the command differential pressure ΔPd is smaller than the actual differential pressure (i.e., when the command current value Id is smaller than the current value corresponding to the actual differential pressure), the pressure-increasing valve PUfr is opened to establish communication between the upstream side of the FR brake hydraulic pressure adjusting section 33 and the wheel cylinder Wfr. As a result, the brake hydraulic pressure at the upstream side of the FR brake hydraulic pressure adjusting section 33 flows into the wheel cylinder Wfr, whereby the actual differential pressure can be adjusted to agree with the command differential pressure ΔPd.

Specifically, the actual differential pressure (its allowable maximum value) can be controlled in accordance with the command current value Id to the pressure-increasing valve PUfr. Further, when the pressure-increasing valve PUfr is brought into the non-excited state (i.e., when the command current value Id is set to "0"), the pressure-increasing valve PUfr holds its open state by the urging force of the coil spring. Moreover, the command current value Id is set to a value (open close-valve holding current value Ihold, see FIG. 3) corresponding to the command differential pressure ΔPd that is sufficiently greater than the differential pressure that can be generated as the actual differential pressure, whereby the pressure-increasing valve PUfr holds its closed state.

Thus, when the command current value Id to the pressure-increasing valve PUfr is gradually decreased from the current value corresponding to the actual differential pressure at this point with the pressure-reducing valve PDfr closed, the actual differential pressure gradually decreases, with the result that the brake hydraulic pressure in the wheel cylinder Wfr (wheel cylinder hydraulic pressure) gently increases. The operation in this case is referred to as linear pressure-increasing mode. It should be noted that the operation in a pulse pressure-increasing mode described later may be executed.

Further, when the pressure-reducing valve PDfr is closed with the pressure-increasing valve PUfr kept closed, regardless of the hydraulic pressure in the upstream side of the FR brake hydraulic pressure adjusting section 33, the hydraulic pressure in the wheel cylinder Wfr at the time of changeover is maintained. The operation in this case is referred to as holding mode. Further, when the pressure-increasing valve is kept to be closed and the pressure-reducing valve PDfr is opened, the brake hydraulic pressure in the wheel cylinder Wfr is returned to the reservoir RSf, thereby reducing the wheel cylinder hydraulic pressure. The operation in this case is referred to as pressure-reducing mode. In this manner, the brake hydraulic pressure in the wheel cylinder Wfr (wheel cylinder hydraulic pressure) can be linear-increased, held or decreased according to three types of modes such as the linear pressure-increasing mode, holding mode and pressure-reducing mode.

A check valve CV1 which allows flow of the brake fluid in only one direction from the wheel cylinder Wfr side to the upstream side of the FR brake hydraulic pressure adjusting section 33 is connected in parallel with the pressure-increasing valve PUfr. As a result, when the brake pedal BP is released after being operated, the brake hydraulic pressure in the wheel cylinder Wfr is rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. By controlling the positions of each pressure-increasing valve (normally-open linear solenoid valve) and pressure-reducing valve (normally-closed solenoid on-off valve), the brake hydraulic pressure in the wheel cylinder Wfl, the wheel cylinder Wrr, and the wheel cylinder Wrl can be increased, held, or decreased. Check valves CV2, CV3, and CV4 are provided in parallel with the pressure-increasing valves PUfl, PUrr, and PUrl, respectively, to provide the same function as that of the check valve CV1.

The return brake fluid supply section 37 includes a DO motor MT, and two hydraulic pumps HPf and HPr simultaneously driven by the motor MT. The hydraulic pump HPf pumps, via a check valve CV7, the brake fluid returned from the pressure reducing valves PDfr and PDfl to the reservoir RSf, and supplies the pumped brake fluid to the upstream sides of the FR brake hydraulic pressure adjusting section 33 and the FL brake hydraulic pressure adjusting section 34 via check valves CV8 and CV9.

Similarly, the hydraulic pump HPr pumps, via a check valve CV10, the brake fluid returned from the pressure reducing valves PDrr and PDrl to the reservoir RSr, and supplies the pumped brake fluid to the upstream sides of the RR brake hydraulic pressure adjusting section 35 and the RL brake hydraulic pressure adjusting section 36 via check valves CV11 and CV12. Notably, in order to reduce pulsations of discharge pressures of the hydraulic pumps HPf and HPr, dampers DMf and DMr are disposed in a hydraulic circuit between the check valves CV8 and CV9 and a hydraulic circuit between the check valves CV11 and CV12, respectively.

The motor MT (accordingly, the hydraulic pumps HPf and HPr) is, in principle, driven with a predetermined revolution speed during only when at least one of the pressure-reducing valves PDfr, PDfl, PDrr and PDrl is closed (i.e., when the pressure-reducing mode is selected for at least one wheel).

With the structure described above, when all the solenoid valves are in their non-excited positions, the brake hydraulic pressure control apparatus 30 supplies to each wheel cylinder a brake hydraulic pressure corresponding to the operating force of the brake pedal BP (i.e., master cylinder hydraulic pressure). In this state, it becomes possible to decrease only the brake hydraulic pressure in, for example, the wheel cylinder Wrr from the (second) master cylinder hydraulic pressure by a prescribed amount through control of the pressure-increasing valve PUrr and the pressure-reducing valve PDrr. That is, the brake hydraulic pressure control apparatus 30 can individually decrease the wheel cylinder hydraulic pressure of each wheel from the master cylinder hydraulic pressure.

Referring back to FIG. 1, the vehicle motion control apparatus 10 includes wheel speed sensors 41fl, 41fr, 41rl, and 41rr which each output a signal having a pulse each time the corresponding wheel rotates by a prescribed angle; a brake switch 42 that is brought into on-state (High signal) or off-state (Low signal) according to whether the brake pedal BP is operated or not; and an electronic controller 50.

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to the wheel speed sensors 41 and the brake switch 42. The interface 55 supplies signals from the wheel speed sensors 41 and the brake switch 42 to the CPU 51. Further, in accordance with instructions from the CPU 51, the interface 55 transmits a driving signal to the solenoid valves (pressure-increasing valve PU and pressure-reducing valve PD) and the motor MT of the brake hydraulic pressure control apparatus 30.

In the following description, the symbol "" appended to various variables and the like collectively represents the symbols fl, fr, rl, and rr and indicates that the particular variable or the like applies to all of the wheels FR, FL, etc. of the vehicle. For example, the pressure-increasing valve PU collectively indicates the pressure-increasing valve PUfl for the front left wheel, the pressure-increasing valve PUfr for the front right wheel, the pressure-increasing valve PUrl for the rear left wheel, and the pressure-increasing valve PUrr for the rear right wheel.

Thus, the above-mentioned command current value Id (energizing current value) to the pressure-increasing valve PU is controlled by the CPU 51. Specifically, the CPU 51 adjusts the ratio of the energizing time Ton to the pressure-increasing valve PU to one cycle time Tcycle (i.e., duty ratio Ratioduty=Ton/Tcycle), thereby adjusting the average (effective) current as the command current value Id. As a result, the command current value Id can be individually variably controlled so as to be linear for every wheel.

The brake hydraulic pressure control apparatus 30 (CPU 51) explained above executes an ABS control in order that a slip of the wheel caused by the operation on the brake pedal BP by a driver does not become excessive. The ABS control is the control of properly decreasing the wheel cylinder hydraulic pressure for a specific wheel from the master cylinder hydraulic pressure by the control of decreasing, holding or increasing the wheel cylinder hydraulic pressure for the specific wheel, when the specific wheel tends to slip (lock).

Outline of ABS Control

Next, there will be described an outline of the ABS control performed by the vehicle motion control apparatus 10 (hereinafter may be referred to as "present apparatus") including the brake hydraulic pressure control apparatus according to the present embodiment. The present apparatus starts the ABS control in response to the establishment of predetermined ABS control start conditions. In this ABS control in principle, the pressure-reducing control is started and executed simultaneous with the establishment of the ABS control start conditions, and the holding control is started and executed after the pressure-reducing control when predetermined holding control start conditions are satisfied during this pressure-reducing control. Further, when predetermined pressure-increasing control start conditions are satisfied during the holding control, the linear pressure-increasing control is executed after the holding control.

When the ABS control start conditions are again satisfied during the linear pressure-increasing control in this-time ABS control, the linear pressure-increasing control is ended and the next-time ABS control is continuously started. Specifically, supposing that the period from the point when the ABS control start conditions are satisfied to the next point when the ABS control start conditions are satisfied is defined as one control cycle, the present apparatus, in principle, continuously executes the ABS control, in which the pressure-reducing control, holding control and linear pressure-increasing control make one set, plural times over control cycles of plural times until predetermined ABS control ending conditions are satisfied.

On the other hand, in order to obtain the current value corresponding to the actual differential pressure at the point of starting the second-time linear pressure-increasing control (accordingly, the linear pressure-increasing control after the second time), the present apparatus executes a pulse pressure-increasing control instead of the linear pressure-increasing control only at the first-time pressure-increasing control. The ABS control by the present apparatus will be more specifically explained hereinafter with reference to FIGS. 5 to 7.

Figure 5:
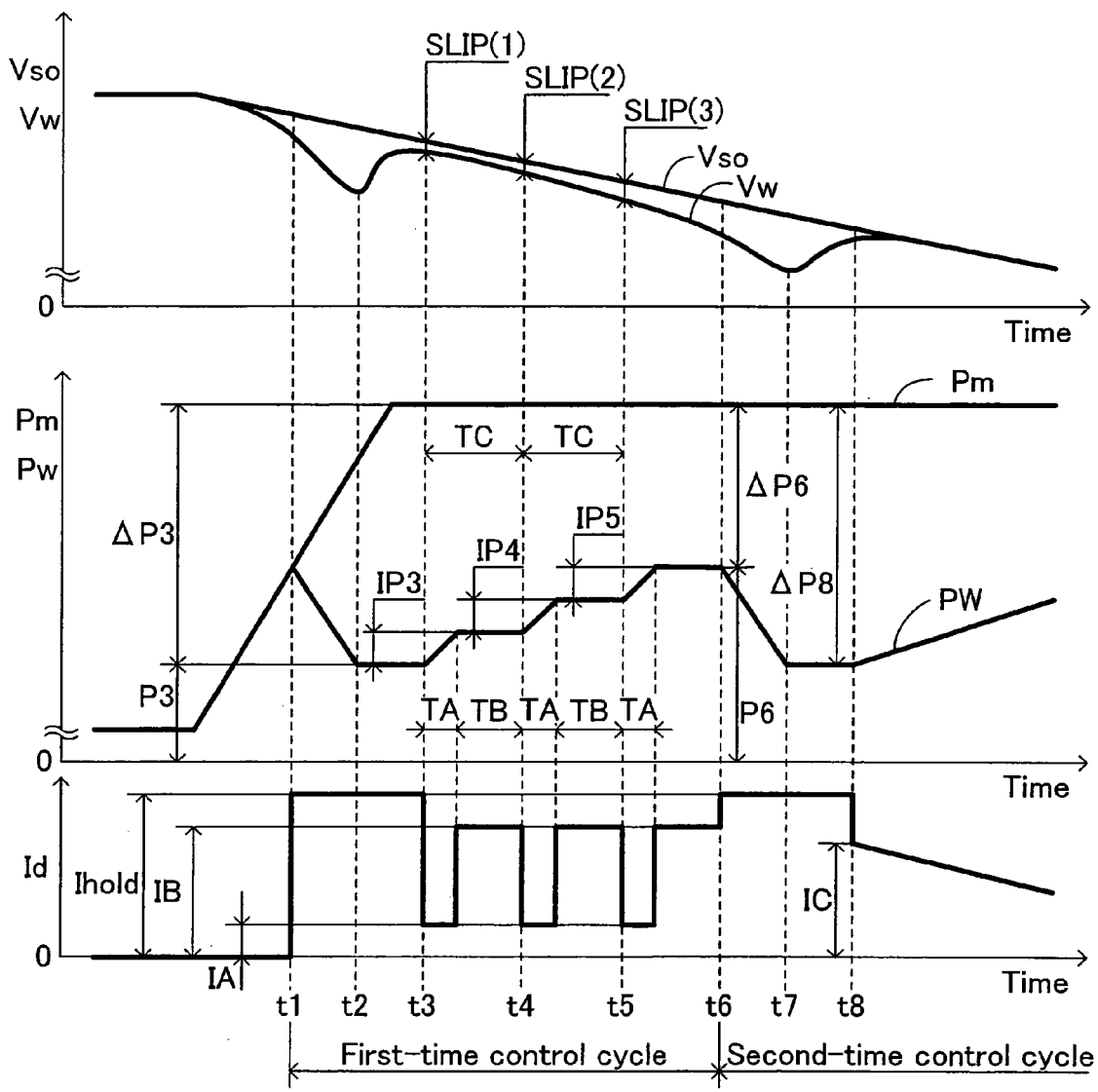
FIG. 5 is a first-half section of a time chart showing one example of a change in estimated vehicle body speed, wheel speed, master cylinder hydraulic pressure, wheel cylinder hydraulic pressure and command current value to the pressure-increasing valve that is the linear solenoid valve, in case where the ABS control is executed by the brake hydraulic pressure control apparatus shown in FIG. 1.
Figure 6:
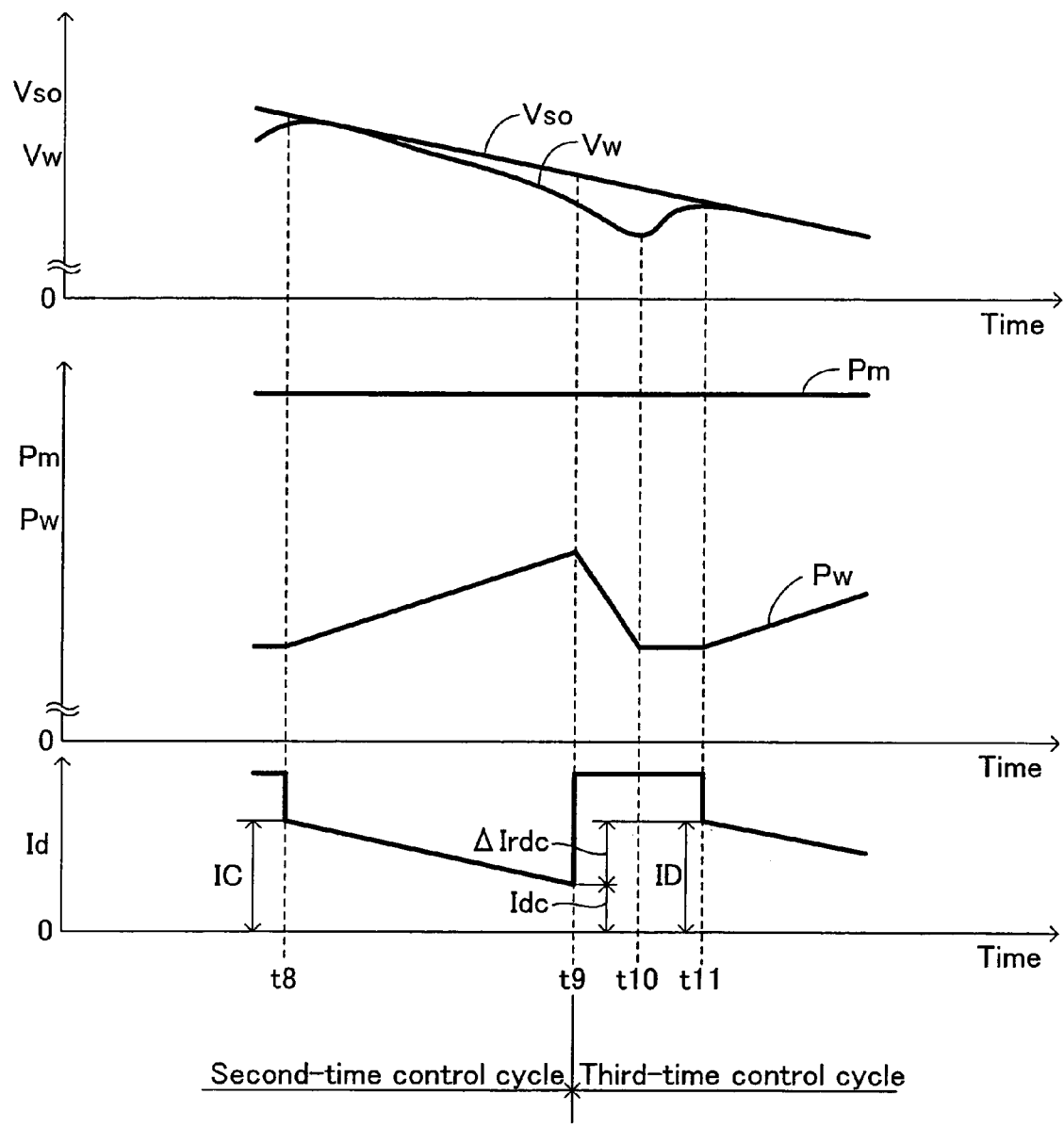
FIG. 6 is a second-half section of a time chart showing one example of a change in estimated vehicle body speed, wheel speed, master cylinder hydraulic pressure, wheel cylinder hydraulic pressure and command current value to the pressure-increasing valve that is the linear solenoid valve, in case where the ABS control is executed by the brake hydraulic pressure control apparatus shown in FIG. 1.

FIG. 5 and FIG. 6 are respectively a first-half section and a second-half section of a series of time chart showing one example of a change in (estimated) vehicle body speed Vso, wheel speed Vw, master cylinder hydraulic pressure Pm, wheel cylinder hydraulic pressure Pw and command current value Id (i.e., energizing current value) to the pressure-increasing valve PU** that is the linear solenoid valve, when the ABS control is executed by this apparatus.

FIG. 5 and FIG. 6 show the case where the driver of the vehicle shown in FIG. 1 continuously performs relatively rapid and strong brake operation from a certain point before a time t1, whereby the master cylinder hydraulic pressure Pm rapidly starts to increase from the same point, keeps on increasing over a relatively long period of time even after the first-time ABS control start conditions are satisfied at the time t1 and is kept to be a constant value after that.

In this case, since the ABS control is not executed before time t1, the wheel cylinder hydraulic pressure Pw becomes equal to the master cylinder hydraulic pressure Pm as shown in FIG. 5. Upon having reached time t1, the ABS control start conditions are satisfied, so that the present apparatus starts the pressure-reducing control (pressure-increasing valve PU: closed (command current value: Ihold), pressure-reducing valve PD: open). As a result, the first-time control cycle is started and the wheel cylinder hydraulic pressure Pw starts to decrease. The ABS control start conditions in this example are "SLIP>SLIPref, and |DVw|>Dvwref".

Here, SLIP is a slip amount for the wheel. The slip amount SLIP is represented by the following equation (1). In the equation (1), Vso is an estimated vehicle body speed. In this example, it is the maximum value of the wheel speeds Vw for each wheel. DVw is a wheel acceleration (i.e., time-differentiated value) for the wheel. SLIPref and Dvwref are respectively predetermined constants.

$$SLIP = Vso - Vw \quad (1)$$

Subsequently, upon having reached time t2, the holding control start condition is satisfied, so that the present apparatus starts the holding control (pressure-increasing valve PU: closed (command current value: Ihold), pressure-reducing valve PD: closed) after the pressure-reducing control. As a result, the wheel cylinder hydraulic pressure Pw is kept to be a constant value after time t2. The holding control start condition in this example is that "DVw** is changed to a positive value from a negative value".

Upon having reached time t3, the pressure-increasing control start condition is satisfied, so that the present apparatus executes the pulse pressure-increasing control instead of the linear pressure-increasing control only for the present control cycle. The pressure-increasing control start condition in this example is "SLIP**<SLIPref1". SLIPref1 is a predetermined constant. Subsequently explained is the pulse pressure-increasing control.

The present apparatus holds the command current value Id to the open-valve holding current value IA, that is slightly greater than "0", over a predetermined pressure-increasing time TA with the pressure-reducing valve PD maintained in its closed state, thereby maintaining the pressure-increasing valve PU in its open state over the pressure-increasing time TA. Then, the present apparatus holds the command current value Id to the closed-valve holding current value IB, that is slightly smaller than the closed-valve holding current value Ihold, over a predetermined holding time TB, thereby maintaining the pressure-increasing valve PU** in its closed state over the holding time TB.

According to this, the wheel cylinder hydraulic pressure Pw increases by an increasing amount IP3 during the pressure-increasing time TA after time t3 and is kept to be the constant value during the following holding time TB. The pressure-increasing and holding controls for the wheel cylinder hydraulic pressure Pw, wherein the time TC (=TA+TB) that is the sum of the pressure-increasing time TA and the holding time TB makes one pulse period, is referred to as the pulse pressure-increasing control.

The present apparatus successively and repeatedly executes the pulse pressure-increasing control until the previous ABS control start conditions are again satisfied (accordingly, until the second-time control cycle is started). In the example shown in FIG. 5, the present apparatus starts the second-time pulse pressure-increasing control at time t4 when one pulse cycle TC has been elapsed from time t3. This allows the wheel cylinder hydraulic pressure Pw to increase by the increasing amount IP4 during the pressure-increasing time TA after time t4. Further, the present apparatus executes the third-time pulse pressure-increasing control at time t5 when one pulse cycle TC has been elapsed from time t4. This allows the wheel cylinder hydraulic pressure Pw to increase by the increasing amount IP5 during the pressure-increasing time TA after time t5.

Upon having reached time t5 that is the point before the pulse cycle TC of the third-time pulse pressure-increasing control has been elapsed, the ABS control start conditions are again satisfied, so that the present apparatus stops the third-time pulse pressure-increasing control that is currently being executed. Thus, the first-time control cycle is ended and the second-time control cycle is started. Specifically, like the first-time control cycle, the present apparatus executes the pressure-reducing control from time t6 to time t7 that is the point when the holding control starting control is satisfied and executes again the holding control during the period from time t7 to time t8 that is the point when the pressure-increasing control start condition is satisfied.

In this case, the increasing amount IP3 of the wheel cylinder hydraulic pressure Pw is a value determined by the actual differential pressure ΔP3 at time t3. Accordingly, the actual differential pressure (ΔP3–IP3) at time t4 is also the value determined by the actual differential pressure ΔP3 at time t3. Further, the increasing amount IP4 of the wheel cylinder hydraulic pressure Pw by the second-time pulse pressure-increasing control at time t4 is the value determined by the actual differential pressure at time t4. Accordingly, the increasing amount IP4 is also the value determined by the actual differential pressure ΔP3 at time t3. As a result, the actual differential pressure (ΔP3–IP3–IP4) at time t5 is also the value determined by the actual differential pressure ΔP3 at time t3. Moreover, the increasing amount IP5 of the wheel cylinder hydraulic pressure Pw by the third-time pulse pressure-increasing control is the value determined by the actual differential pressure at time t5. Accordingly, the increasing amount IP5 is also the value determined by the actual differential value ΔP3 at time t3. As a result, the actual differential pressure ΔP6 (ΔP6=IP3–IP4–IP5) is also the value determined by the actual differential pressure ΔP3 at time t3.

From the above, each of the increasing amounts IP3, IP4 and IP5 of the wheel cylinder hydraulic pressure Pw during the pulse pressure-increasing control is the value determined by the actual differential pressure ΔP3 at the point when the first-time pulse pressure-increasing control is started (i.e., at time t3), whereby all the increasing amounts IP3, IP4 and IP5 take great values as the actual differential pressure ΔP3 is great.

Accordingly, the number of times of the pulse pressure-increasing controls (hereinafter referred to as "pulse pressure-increasing control times PULSE". In this example, "PULSE=3") required until the wheel cylinder hydraulic pressure Pw reaches the value P6, that is great enough to establish again the ABS control start conditions, from the value P3 at the point of starting the first-time pulse pressure-increasing control is reduced as the actual differential pressure ΔP3 at the point of starting the first-time pulse pressure-increasing control is great.

In other words, there is a predetermined correlation between the value of the pulse pressure-increasing control times PULSE and the actual differential pressure ΔP3 at the point of starting the first-time pulse pressure-increasing control (at time t3). On the other hand, there is a predetermined correlation between the actual differential pressure ΔP6 at the point of ending the pulse pressure-increasing control (at time t6) and the actual differential pressure ΔP3 as described above. Specifically, the actual differential pressure ΔP6 at the point of ending the pulse pressure-increasing control (accordingly, the point of starting the second-time ABS control. At time t6) is also correlated with the pulse pressure-increasing control times PULSE. To be more specific, the greater the actual differential pressure ΔP6 becomes, the smaller the pulse pressure-increasing control times PULSE becomes.

Figure 7:
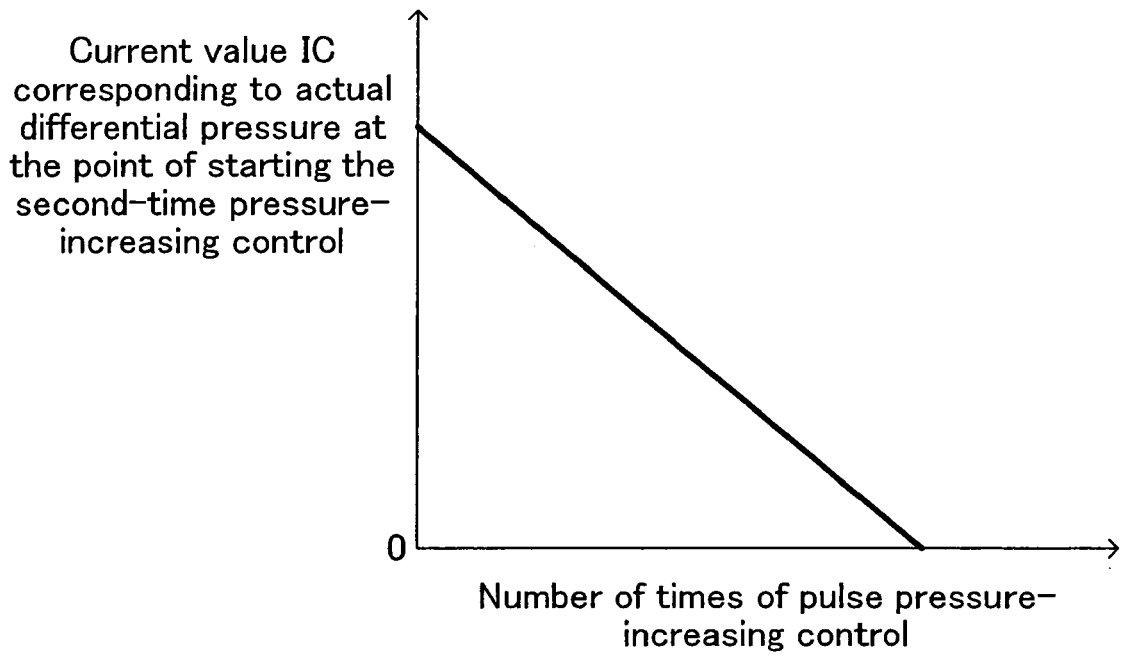
FIG. 7 is a graph showing a table that is referred to by the CPU shown in FIG. 1 and specifies the relationship between the number of times of the pulse pressure-increasing control and the current value corresponding to the actual differential pressure at the point of starting the second-time pressure-increasing control.

Therefore, supposing that the decreasing amount of the wheel cylinder hydraulic pressure Pw during the pressure-reducing control (from time t6 to time t7) in the second-time ABS control is constant, there is a relationship in which the actual differential pressure ΔP8 (accordingly, the current value IC corresponding to the actual differential pressure at the point of starting the second-time pressure-increasing control (at time t8)) at the point of starting the second-time pressure-increasing control (at time t8) becomes great as the pulse pressure-increasing control times PULSE decreases as shown in FIG. 7. From the above, the current value corresponding to the actual differential pressure at the point of starting the pressure-increasing control (at time t8) in the second-time ABS control can be obtained from the graph shown in FIG. 7 and the pulse pressure-increasing control times PULSE.

In view of this, the present apparatus stores beforehand in the ROM 52 a table MapIC that specifies the relation between the pulse pressure-increasing control times PULSE and the current value IC corresponding to the actual differential pressure. Upon having reached time t8, the present apparatus obtains the current value IC corresponding to the actual differential pressure at the point of starting the second-time pressure-increasing control (at time t8) based upon the value of the pulse pressure-increasing control times PULSE ("3" in the example shown in FIG. 5) and the table MapIC, and sets the command current value Id at this point to the current value IC corresponding to the actual differential pressure.

Subsequently, the present apparatus gradually decreases the command current value Id with a predetermined slope with the lapse of time after time t8 in order to execute the linear pressure-increasing control. This allows the wheel cylinder hydraulic pressure Pw to gently increase with an optimum predetermined upgrade after time t8 as shown in FIG. 6. During this period, the command current value Id keeps on agreeing with the current value corresponding to the actual differential pressure one after another.

Since the ABS control start conditions are again satisfied upon having reached time t9, the present apparatus stops the linear pressure-increasing control that is currently being executed. This ends the second-time control cycle and starts the third-time control cycle. At this time, the present apparatus stores the command current value Id at time t9 as the current value Idc corresponding to the actual differential pressure at the point of starting the pressure-reducing control.

Then, the present apparatus executes the pressure-reducing control during the period from time t9 to time t10 when the holding control start condition is satisfied, and obtains a current value ΔIrdc corresponding to the reduced pressure, that corresponds to the increasing actual differential pressure due to the decrease of the wheel cylinder hydraulic pressure Pw during the pressure-reducing control, in accordance with the following equation (2) at time t10. In the equation (2), Trdc is a continuation time of the pressure-reducing control and Krdc is a predetermined coefficient. Note that ΔIrdc may be set to a predetermined constant value.

$$\Delta Irdc = Krdc \cdot Trdc \qquad (2)$$

Subsequently, the present apparatus executes again the holding control during the period from time t10 to time t11 that is the point when the pressure-increasing control start condition is satisfied, and at time t11 (i.e., at the point of starting the third-time pressure-increasing control), sets the command current value Id to the value ID (ID=Idc+ΔIrdc) obtained by adding the current value ΔIrdc corresponding to the reduced pressure to the current value Idc corresponding to the actual differential pressure at the point of starting the pressure-reducing control. According to this, the command current value Id at time t11 agrees with the current value corresponding to the actual differential pressure at the same point.

Then, the present apparatus executes again the linear pressure-increasing control like the case after the point of starting the second-time pressure-increasing control (at time t8) after time t11. After that, like the third-time ABS control, the present apparatus obtains the command current value Id at the point of starting the linear pressure-increasing control as the current value ID (ID=Idc+ΔIrdc) corresponding to the actual differential pressure during the fourth-time and the following each ABS control. In this manner, so long as the ABS control ending conditions are not satisfied, the present apparatus executes once the ABS control in which the pressure-reducing control, holding control and pulse pressure-increasing control make one set, and after the second-time ABS control, repeatedly executes the ABS control in which the pressure-reducing control, holding control and linear pressure-increasing control make one set, in order to obtain the current value corresponding to the actual differential pressure at the point of starting the second-time (and the following) linear pressure-increasing controls in the first-time ABS control. The above is the outline of the ABS control.

Changing the Holding Time During Pulse Pressure-Increasing Control

A predetermined optimum value is present in the upgrade of the wheel cylinder hydraulic pressure Pw during the pressure-increasing control in the ABS control. As previously mentioned, the wheel cylinder hydraulic pressure Pw is controlled to gently increase with the optimum predetermined upgrade during the linear pressure-increasing control executed in the second-time and following ABS controls.

On the other hand, the average upgrade of the wheel cylinder hydraulic pressure Pw during the pulse pressure-increasing control (period from t3 to t6 in FIG. 5) executed in the first-time ABS control depends upon the actual differential pressure ΔP3 at the point of starting the first-time pulse pressure-increasing control (at time t3) and the greater the actual differential pressure ΔP3 becomes, the greater the average upgrade becomes (the upgrade becomes sharp). This is because each increasing amount (IP3, IP4 and IP5) of the wheel cylinder hydraulic pressure Pw during the pulse pressure-increasing control becomes great as the actual differential pressure ΔP3 becomes great.

Therefore, in case where the actual differential pressure ΔP3 is extremely great, the average upgrade of the wheel cylinder hydraulic pressure Pw during the pulse pressure-increasing control can be an extremely great value. In this case, it is necessary to decrease the upgrade in order to bring it close to the optimum value. In order to decrease the upgrade, it is necessary to shorten the pressure-increasing time TA or to increase the holding time TB. However, shortening the pressure-increasing time TA changes the pulse pressure-increasing control times PULSE in the increasing direction, whereby the current value IC corresponding to the actual differential pressure cannot correctly be obtained. From the above, it is preferable to increase the holding time TB in order to decrease the upgrade of the wheel cylinder hydraulic pressure Pw during the pulse pressure-increasing control.

On the other hand, the fact that the upgrade of the wheel cylinder hydraulic pressure Pw during the pulse pressure-increasing control becomes extremely great can be detected by detecting that the tendency of increasing the slip amount SLIP** for the specific wheel during the pulse pressure-increasing control is great.

In view of this, the present apparatus successively obtains the slip amount of the wheel (SLIP(1), SLIP(2) and SLIP(3); see FIG. 5) at each point (time t3, t4 and t5) when the pulse pressure-increasing control is started, and determines that the upgrade of the wheel cylinder hydraulic pressure Pw during the pulse pressure-increasing control becomes extremely great when the value obtained by subtracting the slip amount SLIP(k−1) at the point of starting the pulse pressure-increasing control obtained last time from the slip amount SLIP(k) at the point of starting the pulse pressure-increasing control obtained this time becomes greater than the predetermined value ΔSLIPref. The present apparatus then sets the holding time TB during the this-time pulse pressure-increasing control slightly longer (actually, the pulse cycle TC during this-time pulse pressure-increasing control is set to (TC+ΔTC (>0)) wherein ΔTC is an extension time). The above is the outline of the change in the holding time during the pulse pressure-increasing control.

Actual Operation

The actual operation of the vehicle motion control apparatus 10, which includes the brake hydraulic pressure control apparatus according to the embodiment of the present invention having the above-described structure, will be explained while referring to FIGS. 8 to 13, which show, in the form of flowcharts, routines which are executed by the CPU 51 of the electronic controller 50.

Figure 8:
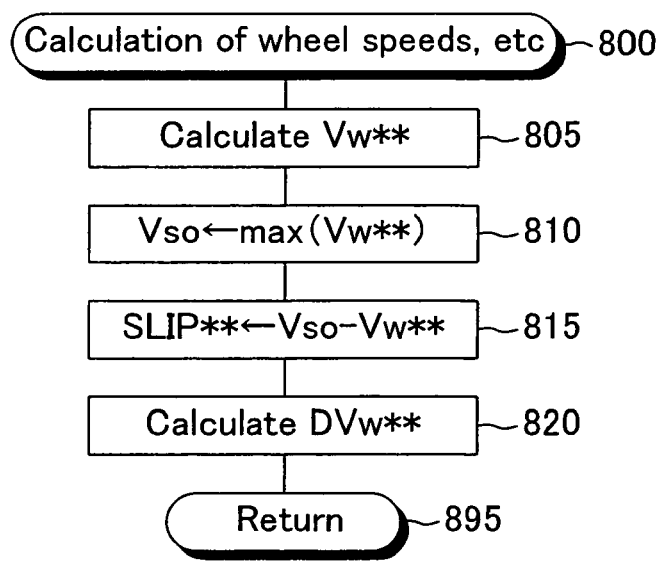
FIG. 8 is a flowchart showing a routine which the CPU shown in FIG. 1 executes in order to calculate wheel speed and other parameters.

At predetermined time intervals, the CPU 51 repeatedly performs a routine shown in FIG. 8 for calculating wheel speed Vw, etc. Accordingly, when a predetermined timing is reached, the CPU 51 starts processing of the routine from Step 800, and proceeds to Step 805 so as to calculate the wheel speed Vw of the wheel (the speed of the outer periphery of the wheel). Specifically, the CPU 51 calculates the wheel speed Vw on the basis of the time intervals between pulses of a signal which each wheel speed sensor 41 outputs.

Next, the CPU 51 proceeds to Step 810 and calculates the highest value among the wheel speeds Vw as the estimated vehicle body speed Vso. Alternatively, the average of the wheel speeds Vw may be calculated as the estimated vehicle body speed Vso. Subsequently, the CPU 51 proceeds to Step 815 and calculates the slip amount SLIP of the wheel on the basis of the value of the estimated vehicle body speed Vso calculated in Step 810, the value of the wheel speed Vw** calculated in Step 805, and the equation (1).

Subsequently, the CPU 51 proceeds to Step 820 and calculates the wheel acceleration DVw of the wheel, which is a time-differentiated value of the wheel speed Vw, in accordance with the following equation (3). Subsequently, the CPU 51 proceeds to Step 895 so as to end the present routine. After that, the CPU 51 repeatedly executes the present routine. In the equation (3), Vw1 represents the wheel speed Vw** calculated in Step 805 during the previous execution of the present routine, and Δt represents the length of the above-described, predetermined intervals (the computation cycles of the CPU 51).

$$DVw^{}=(Vw^{}-Vw1^{**})/\Delta t \qquad (3)$$

Figure 9:
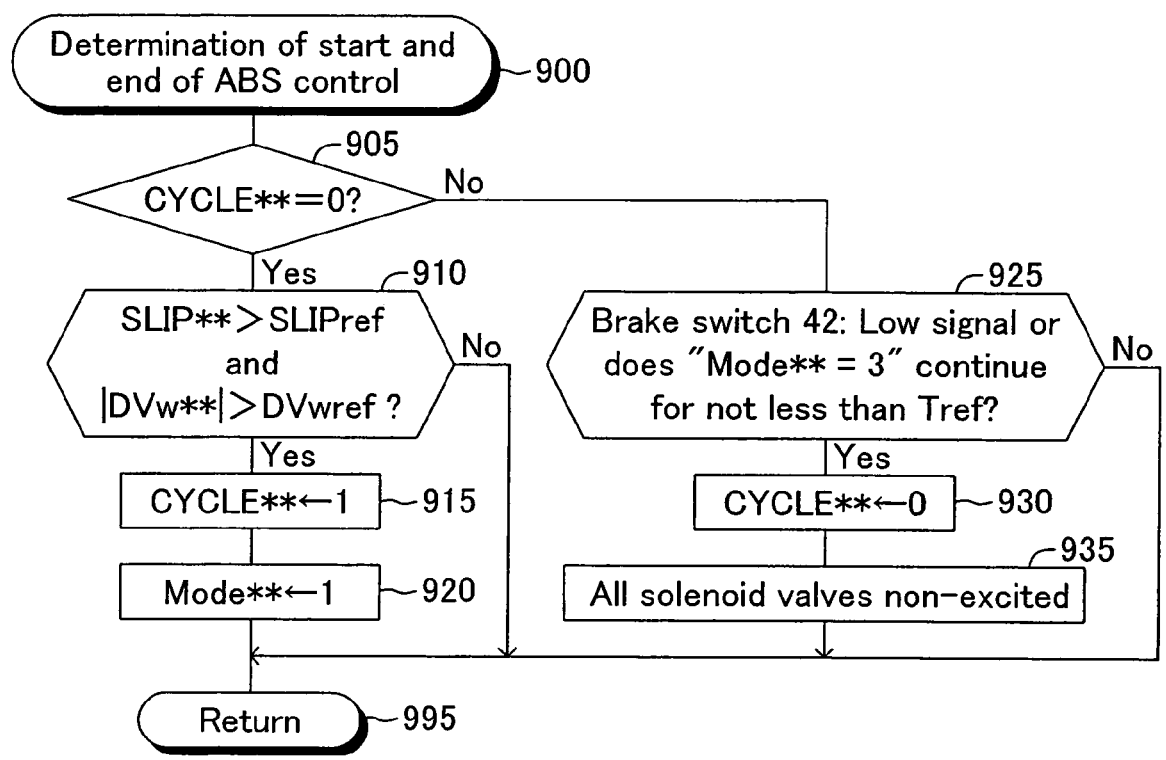
FIG. 9 is a flowchart showing a routine which the CPU shown in FIG. 1 executes in order to perform judgment on start and end of ABS control.

Further, the CPU 51 repeatedly performs a routine shown in FIG. 9 for determining start and end of ABS control at predetermined time intervals. Accordingly, when a predetermined timing is reached, the CPU 51 starts processing of the routine from Step 900, and proceeds to Step 905 so as to determine whether the value of a variable CYCLE is "0" or not. The variable CYCLE represents that, for the wheel**, the first-time ABS control is not executed when its value is "0", that the second-time ABS control is executed when its value is "2" and that the third-time ABS control is executed when its value is "3".

The description will be continued on the assumption that the ABS control is currently halted, and the ABS control start conditions have not been satisfied. In this case, since the value of the variable CYCLE is "0," the CPU 51 makes a "Yes" determination in Step 905, and then proceeds to Step 910 in order to determine whether the ABS control start conditions are satisfied. Here, the latest value calculated at the previous Step 815 is used as SLIP and the latest value calculated at the previous Step 820 is used as DVw**.

At the present stage, the ABS control start conditions are not satisfied. Therefore, the CPU 51 makes a "No" determination in Step 910, and immediately proceeds to Step 995 in order to end the present routine. After that, until the ABS control start conditions are satisfied, the CPU 51 repeatedly executes the processing of Steps 900, 905 and Step 910.

Next, the description will be continued on the assumption that the driver operates the brake pedal BP, so that the ABS control start conditions are satisfied in this state (see time t1 in FIG. 5). In this case, the CPU 51 makes a "Yes" determination when it proceeds to Step 910, and then proceeds to Step 915 in order to change the value of the variable CYCLE to "1" from "0". At the following Step 920, the CPU 51 sets the value of a variable Mode to "1". The variable Mode represents that, for the wheel, the pressure-reducing control is executed when its value is "1", that the holding control is executed when its value is "2", and that the pressure-increasing control (i.e., pulse pressure-increasing control or linear pressure-increasing control) is executed when its value is "3".

After that, the CPU 51 makes a "NO" determination when proceeding to Step 905, and then, proceeds to Step 925 in order to monitor whether the ABS control end conditions are satisfied. The ABS control end conditions are satisfied when the brake switch 42 outputs Low signal (i.e., when the driver finishes the operation on the brake pedal BP) or when the state in which "Mode=3" is established (i.e., the execution of the pressure-increasing control) continues for not less than the predetermined time Tref.

Since the present stage is immediately after the ABS control start conditions are satisfied, the CPU 51 makes a "NO" determination at Step 925. After that, until the ABS control end conditions at Step 925 are satisfied, the CPU 51 repeatedly executes the processing of Steps 900, 905 and 925. During the execution of this process, the CPU 51 executes the ABS control successively from the first-time control cycle for the wheel by the execution of the routines shown in FIGS. 10 to 13** described later.

Figure 10:
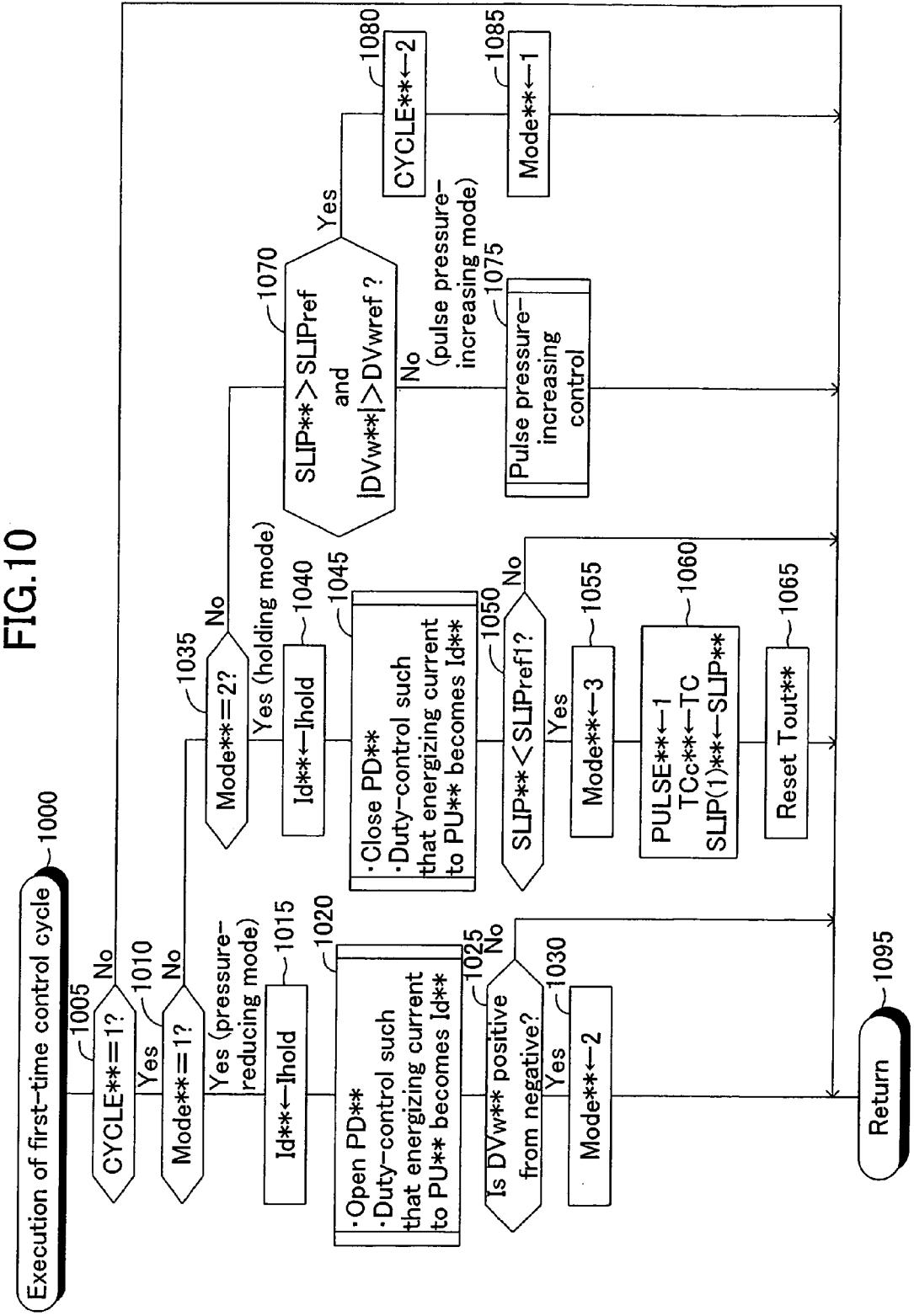
FIG. 10 is a flowchart showing a routine which the CPU shown in FIG. 1 executes in order to execute ABS control according to the first-time control cycle.
Figure 11:
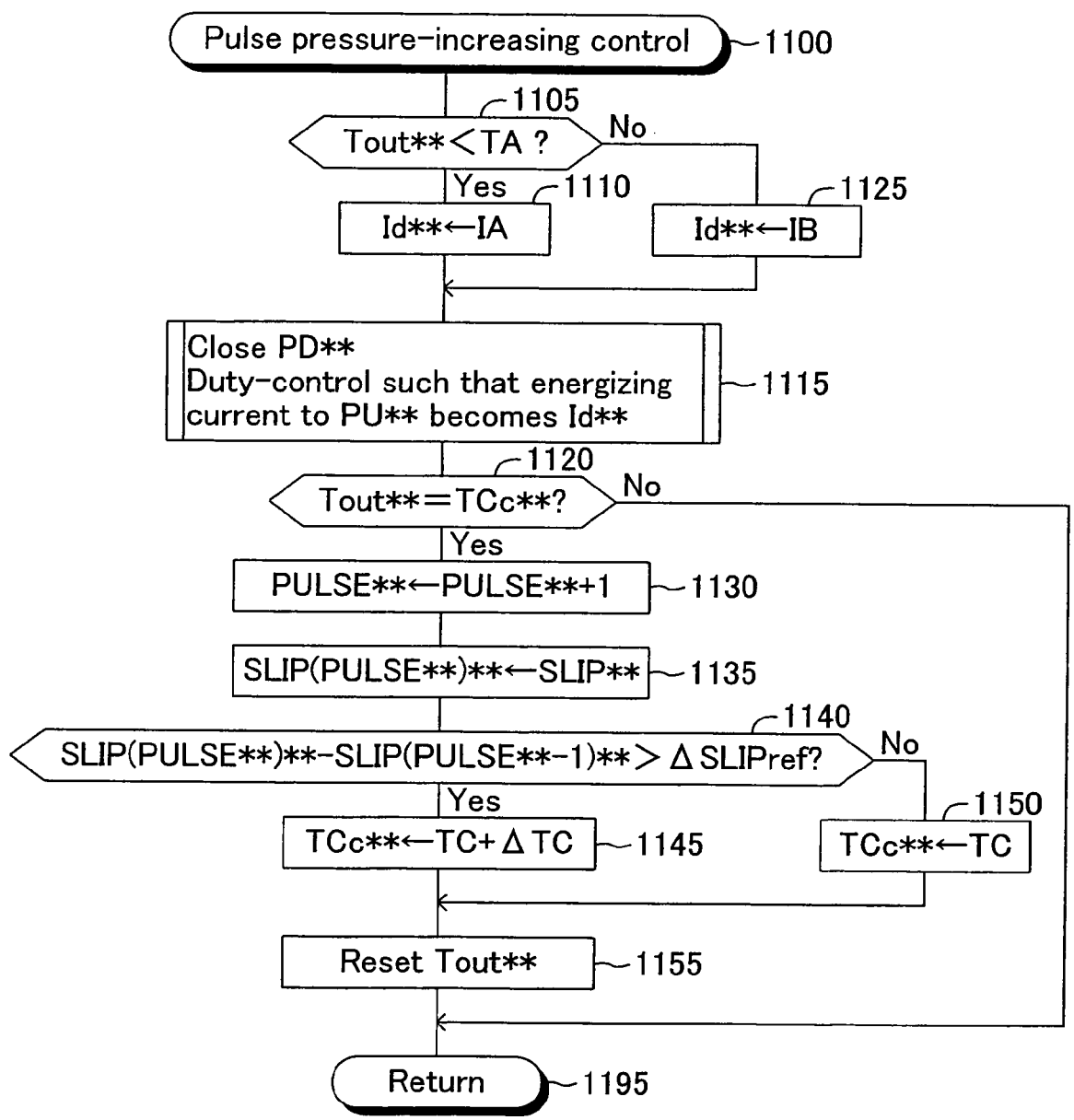
FIG. 11 is a flowchart showing a routine which the CPU shown in FIG. 1 executes in order to execute pulse pressure-increasing control.

The CPU 51 repeatedly performs a routine shown in FIG. 10 for executing the first-time control cycle at predetermined time intervals. Accordingly, when a predetermined timing is reached, the CPU 51 starts processing of the routine from Step 1000, and proceeds to Step 1005 so as to determine whether the value of the variable CYCLE is "1". In case where the CPU 51 makes a "NO" determination, it immediately proceeds to Step 1095** in order to end the present routine.

The description will be continued on the assumption that the preset stage is immediately after the ABS control start conditions are at first satisfied and immediately after the variable CYCLE is changed to "1" from "0" by the execution of the previous Step 915 (see time t1 in FIG. 5). The CPU 51 makes a "YES" determination at Step 1005 and proceeds to Step 1010 for determining whether the value of the variable Mode is "1".

Since the value of the variable Mode is "1" by the processing at the previous Step 920 at the present point, the CPU 51 makes a "YES" determination at Step 1010 and proceeds to Step 1015 to set the command current value Id to the pressure-increasing valve PU for the wheel to the closed-valve holding current value Ihold. Then, at Step 1020, the CPU 51 brings the pressure-reducing valve PD for the wheel into its open state and duty-controls the energizing current value to the pressure-increasing valve PU in order that the energizing current value becomes the command current value Id (=Ihold). Thus, the pressure-reducing control for the wheel is started and executed.

Subsequently, the CPU 51 proceeds to Step 1025 to determine whether the value of the wheel acceleration DVw for the wheel is changed from the negative value to the positive value (i.e., whether the value of the wheel speed Vw becomes extremely small value), i.e., whether the holding control start condition is satisfied. The latest value calculated at the previous Step 820 is used as DVw. Since the present point is immediately after the pressure-reducing control is started, the value of the wheel speed Vw does not become the extremely small value. Therefore, the CPU 51 makes a "NO" determination at Step 1025 and immediately proceeds to Step 1095. After that, the CPU 51 repeatedly executes the processing of Steps 1000 to 1025 until the holding control start condition is satisfied for the wheel. As a result, the pressure-reducing control for the wheel** is continued.

When the value of the wheel speed Vw becomes the extremely small value after elapse of predetermined time (see time t2 in FIG. 5), the CPU 51 makes a "YES" determination when it proceeds to Step 1025, and then, proceeds to Step 1030 to change the value of the variable Mode from "1" to "2". As a result, the CPU 51 makes a "NO" determination when it proceeds to Step 1010, and then, proceeds to Step 1035.

When the CPU 51 proceeds to Step 1035, it determines whether the value of the variable Mode is "2". Since the value of the variable Mode is "2" by the execution of the processing at Step 1030 at the present point, the CPU 51 makes a "YES" determination at Step 1035 and proceeds to Step 1040 to set the command current value Id to the pressure-increasing valve PU to the closed-valve holding current value Ihold. Then, at Step 1045, the CPU 51 brings the pressure-reducing valve PD into its closed state and duty-controls the energizing current value to the pressure-increasing valve PU in order that the energizing current value becomes the command current value Id (=Ihold). According to this, the holding control for the wheel** is started and executed.

Subsequently, the CPU 51 proceeds to Step 1050 in order to determine whether the value of the slip amount SLIP for the wheel is smaller than the predetermined value SLIPref1, i.e., whether the pressure-increasing control start condition is satisfied. The latest value calculated at the previous Step 815 is used as SLIP. Since the present point is immediately after the holding control is started, the value of the slip amount SLIP is greater than SLIPref1. Accordingly, the CPU 51 makes a "NO" determination at Step 1050 and immediately proceeds to Step 1095. After that, the CPU 51 repeatedly executes the processing of Steps 1000 to 1010 and the processing of Steps 1035 to 1050 until the pressure-increasing control start condition is satisfied for the wheel. As a result, the holding control for the wheel is continued.

When the value of SLIP becomes smaller than the predetermined value SLIPref1 after elapse of predetermined time (see time t3 in FIG. 5), the CPU 51 makes a "YES" determination when it proceeds to Step 1050, and then, proceeds to Step 1055 to change the value of the variable Mode from "2" to "3". Subsequently, in order to prepare for the pressure-increasing control (specifically, the first-time pulse pressure-increasing control) that is to be executed next, the CPU 51 proceeds to Step 1060 to set the value of a variable PULSE to "1", set the value of a variable TCc to the pulse cycle TC and set the value of the variable SLIP(1) to the latest slip amount SLIP calculated at Step 815, and resets the elapsed time Tout at the successive Step 1065**.

Here, PULSE is a value representing the number of times of executing the pulse pressure-increasing control for the wheel at the present point, TCc is a value representing a pulse cycle of the pulse pressure-increasing control that is being executed for the wheel (control pulse cycle), SLIP(k) (k=1, 2, . . . ) is a slip amount for the wheel at the point of starting the kth-time pulse pressure-increasing control, and Tout represents the elapsed time, that is counted by a predetermined timer incorporated in the electronic controller 50, from the point of starting the pulse pressure-increasing control for the wheel that is being executed. As a result, the CPU 51 makes a "NO" determination when proceeding to Step 1035, and then, proceeds to Step 1070.

When the CPU 51 proceeds to Step 1070, it determines whether the ABS control start conditions same as the previous Step 910 are satisfied (i.e., whether the second-time control cycle is started). Since the present point is immediately after the pressure-increasing control is started, the ABS control start conditions are not satisfied. Therefore, the CPU 51 makes a "NO" determination at Step 1070, and then, proceeds to Step 1075. Then, the CPU 51 starts processing of the routine from Step 1100 for executing the pulse pressure-increasing control shown in FIG. 11 via Step 1075.

When the CPU 51 proceeds to Step 1105, it determines whether the elapsed time Tout reaches the pressure-increasing time TA. Since the present point is immediately after the processing at Step 1065 is executed, the elapsed time Tout does not reach the pressure-increasing time TA. Therefore, the CPU 51 makes a "YES" determination at Step 1105, and then, proceeds to Step 1110 to set the command current value Id to the open-valve holding current value IA. Then, at Step 1115, the CPU 51 maintains the pressure-reducing valve PD in its closed state and duty-controls the energizing current value to the pressure-increasing valve PU in order that the energizing current value becomes the command current value Id (=IA). According to this, the first-time pulse pressure-increasing control (the pressure-increasing control in the first-time pulse pressure-increasing control) for the wheel** is started and executed.

Subsequently, the CPU 51 proceeds to Step 1120 in order to determine whether the elapsed time Tout reaches the control pulse cycle TCc (equals to the pulse cycle TC at the present point). Since the elapsed time Tout** does not reach the pulse cycle TC at the present point, the CPU 51 makes a "NO" determination at Step 1120, and immediately proceeds to Step 1095 via Step 1195 and Step 1075 in FIG. 10 in order to end the routine shown in FIG. 10.

After that, so long as the ABS control start conditions are not satisfied, the CPU 51 repeatedly executes the processing at Steps 1000 to 1010, 1035, 1070, 1075 and 1100 to 1120 until the elapsed time Tout agrees with the pressure-increasing time TA. As a result, the first-time pulse pressure-increasing control (the pressure-increasing control in the first-time pulse pressure-increasing control) for the wheel is continued.

When the elapsed time Tout agrees with the pressure-increasing time TA, the CPU 51 makes a "NO" determination when proceeding to Step 1105, and proceeds to Step 1125, instead of Step 1110, to set the command current value Id to the closed-valve holding current value IB. As a result, the holding control in the first-time pulse pressure-increasing control for the wheel** is executed and continued by the repeated execution of Step 1115.

Thereafter, when the elapsed time Tout agrees with the pulse cycle TCc (=TC) (see time t4 in FIG. 5), the CPU 51 makes a "YES" determination when proceeding to Step 1120, and then, proceeds to Step 1130 to increment the value of the variable PULSE by "1" (it becomes "2" from "1" at the present point). At the successive Step 1135, the CPU 51 sets the value of the variable SLIP(PULSE) (at the present point, the slip amount SLIP(2) at the point of starting the second-time pressure-increasing control) to the latest slip amount SLIP** (at the present point) calculated at Step 815.

Subsequently, the CPU 51 proceeds to Step 1140 in order to determine whether the value ((SLIP(2)−SLIP(1) at the present point) obtained by subtracting the variable SLIP(PULSE−1) from the variable SLIP(PULSE) is greater than the predetermined value ΔSLIPref. In case where the CPU 51 makes a "YES" determination (i.e., in case where the upgrade of the wheel cylinder hydraulic pressure Pw is extremely great), the CPU 51 proceeds to Step 1145 to set the control pulse cycle TCc to the value obtained by adding the extension time ΔTC to the pulse cycle TC. On the other hand, when the CPU 51 makes a "NO" determination, the CPU 51 proceeds to Step 1150 to set the value of the control pulse cycle TCc to the pulse cycle TC itself. Then, the CPU 51 proceeds to Step 1155 to reset the elapsed time Tout**, and then, proceeds to Step 1095 via Steps 1195 and 1075 in order to end the routine shown in FIG. 10.

According to this, the first-time pulse pressure-increasing control is ended and the second-time pulse pressure-increasing control is started. Specifically, so long as the ABS control start conditions are not satisfied, the pressure-increasing control is executed by the execution of Steps 1110 and 1115 before the elapsed time Tout reaches the pressure-increasing time TA, and the holding control is executed by the execution of Steps 1125 and 1115 after the elapsed time Tout reaches the pressure-increasing time TA and before the elapsed time Tout reaches the control pulse cycle TCc set at Step 1145 or 1150. When the elapsed time Tout reaches the control pulse cycle TCc (see time t5 in FIG. 5), the second-time pulse pressure-increasing control is ended and the third-time pulse pressure-increasing control is started. In this manner, the pulse pressure-increasing control is continuously and repeatedly executed after that so long as the ABS control start conditions are not satisfied.

When the ABS control start conditions are satisfied (see time t6 in FIG. 5), the CPU 51 makes a "YES" determination when proceeding to Step 1070, and then, proceeds to Step 1080 to change the value of the variable CYCLE to "2" from "1". Then, at the successive Step 1085, the CPU 51 changes the value of the variable Mode from "3" to "1". According to this, the CPU 51 makes a "NO" determination when proceeding to Step 1005 and immediately proceeds to Step 1095 in order to end the routine shown in FIG. 10. As a result, the processing at Step 1075 is not executed, so that the routine shown in FIG. 11 (i.e., pulse pressure-increasing control) is not executed. Accordingly, the first-time control cycle is ended and the value of the variable PULSE at the present point represents the number of times of the pulse pressure-increasing control for the wheel. On the other hand, the CPU 51 executes the ABS control according to the second-time control cycle for the wheel** by the execution of the routine shown in FIG. 12 described later.

Figure 12:
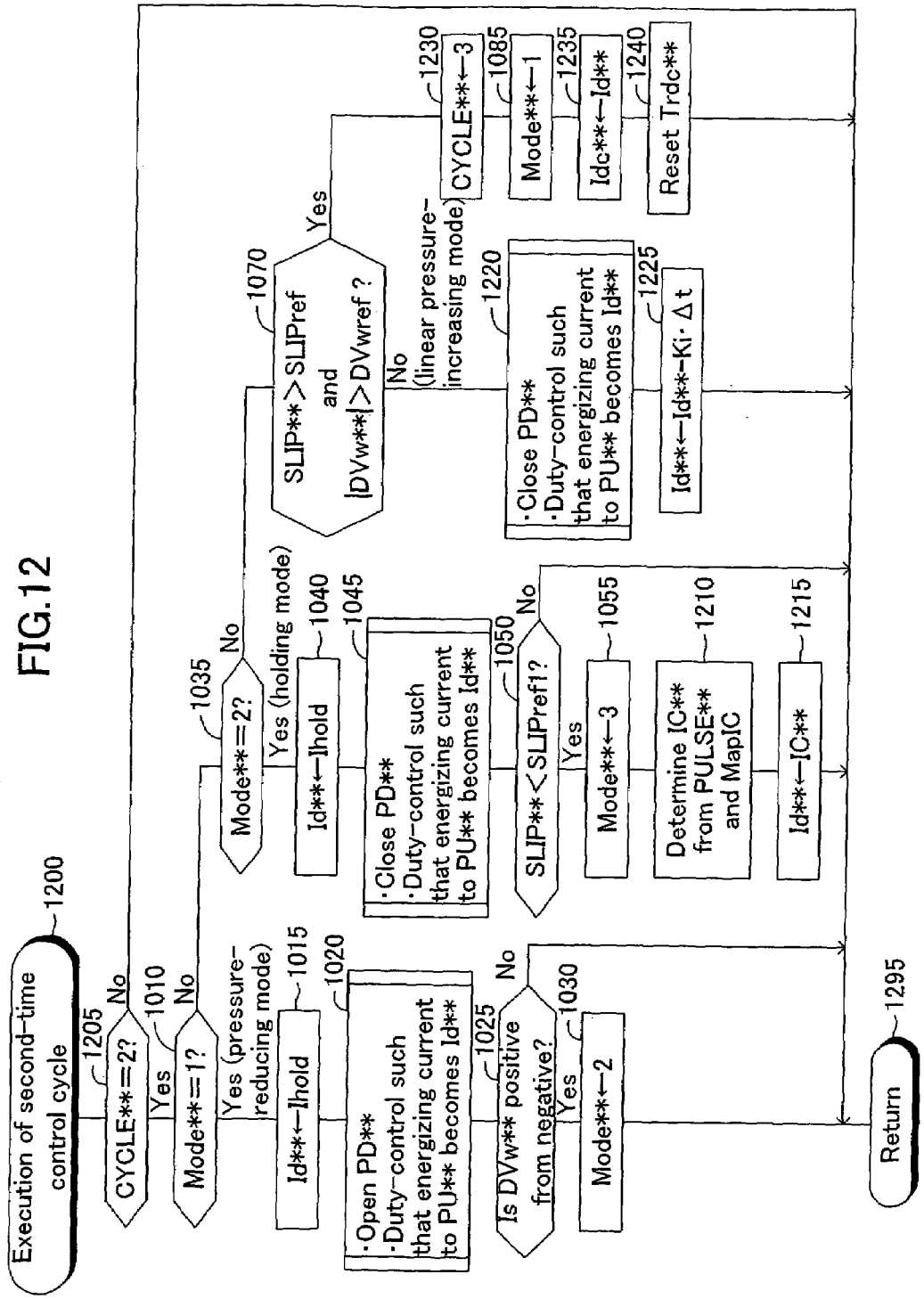
FIG. 12 is a flowchart showing a routine which the CPU shown in FIG. 1 executes in order to execute ABS control according to the second-time control cycle.

Specifically, the CPU 51 repeatedly performs a routine shown in FIG. 12 executing the second-time control cycle at predetermined time intervals. Note that corresponding Step numbers same as those in FIG. 10 are given to Steps in FIG. 12 executing the same processing as that in FIG. 10, thereby omitting the detailed explanation thereof. Therefore, the explanation is made mainly for Steps specific to FIG. 12 hereinafter.

When a predetermined timing is reached, the CPU 51 starts processing of the routine from Step 1200, and proceeds to Step 1205 in order to determine whether the value of the variable CYCLE** is "2". In case where the CPU 51 makes a "NO" determination, it immediately proceeds to Step 1295 to end the present routine.

The description will be continued on the assumption that the present stage is immediately after the second-time ABS control start conditions are satisfied and immediately after the value of the variable CYCLE is changed from "1" to "2" by the execution of the previous Step 1080 (see time t6 in FIG. 5). The CPU 51 makes a "YES" determination at Step 1205 and proceeds to Step 1010 where a "YES" determination is also made since the value of the variable Mode becomes "1" by the execution of the previous Step 1085.

As a result, like the case of the previous first-time control cycle, the pressure-reducing control for the wheel is executed until the condition (holding control start condition) at Step 1025 is satisfied (see the period from time t6 to time t7 in FIG. 5), and after the holding control start condition is satisfied, the holding control is executed for the wheel until the condition (pressure-increasing control start condition) at Step 1050 is satisfied (see the period from time t7 to time t8 in FIG. 5).

When the pressure-increasing control start condition is satisfied, the CPU 51 makes a "YES" determination at Step 1050 and proceeds to Step 1055 to change the value of the variable Mode from "2" to "3". Thereafter, the CPU 51 proceeds to Step 1210 to determine the current value IC corresponding to the actual differential pressure at the time of starting the second-time pressure-increasing control from the value of the variable PULSE at the present point (i.e., pulse pressure-increasing control times for the wheel) and the table MapIC shown in FIG. 7. At the successive Step 1215, the CPU 51 sets the command current value Id to the determined IC. According to this, the command current value Id at the point (see time t8 in FIG. 5**) of starting the linear pressure-increasing control in the second-time control cycle agrees with the current value corresponding to the actual differential pressure at the same point.

Since the value of the variable Mode becomes "3" as a result of this, the CPU 51 makes a "NO" determination at Step 1035 and proceeds to Step 1070. The CPU 51 makes a "NO" determination at Step 1070 so long as the ABS control start conditions are again satisfied, and then, proceeds to Step 1220. When proceeding to Step 1220, the CPU 51 maintains the pressure-reducing valve PD in its closed state and duty-controls the energizing current value to the pressure-increasing valve PU in order that the energizing current value becomes the command current value Id (the above-mentioned IC at the present point). At the successive Step 1225, the CPU 51 sets, as the new command current value Id, the value obtained by subtracting the value "Ki·Δt" from the command current value Id at the present point. Here, Ki is a predetermined constant for obtaining the optimum upgrade of the wheel cylinder hydraulic pressure Pw in the linear pressure-increasing control and Δt is an execution cycle of the present routine by the CPU 51. The processing at Steps 1220 and 1225 is repeatedly performed until the ABS control start conditions are again satisfied. As a result, the command current value Id is gradually decreased and the linear pressure-increasing control for the wheel** is executed.

When the ABS control start conditions are again satisfied (see time t9 in FIG. 6), the CPU 51 makes a "YES" determination when proceeding to Step 1070, and proceeds to Step 1230 to change the value of the variable CYCLE from "2" to "3". At the successive Step 1085, the CPU 51 changes the variable Mode from "3" to "1". Then, the CPU 51 proceeds to Step 1235 to store the command current value Id at the present point (i.e., at the point of ending the second-time pressure-increasing control) as the current value Idc corresponding to the actual differential pressure at the point of starting the pressure-reducing control. Thereafter, the CPU 51 proceeds to Step 1240 to reset the elapsed time Trdc. Here, Trdc represents an elapsed time, that is counted by a predetermined timer incorporated in the electronic controller 50, from the point (i.e., at the point of starting the pressure-reducing control: see time t9 in FIG. 6) of starting the control cycle (the third-time control cycle at the present point) for the wheel** that is to be started after that.

According to this, the CPU 51 makes a "NO" determination when proceeding to Step 1205, and immediately proceeds to Step 1295 in order to end the routine shown in FIG. 12. As a result, the second-time control cycle is ended. On the other hand, the CPU 51 executes the ABS control according to the third-time and the following control cycles for the wheel by the execution of the routine shown in FIG. 13** described later.

Figure 13:
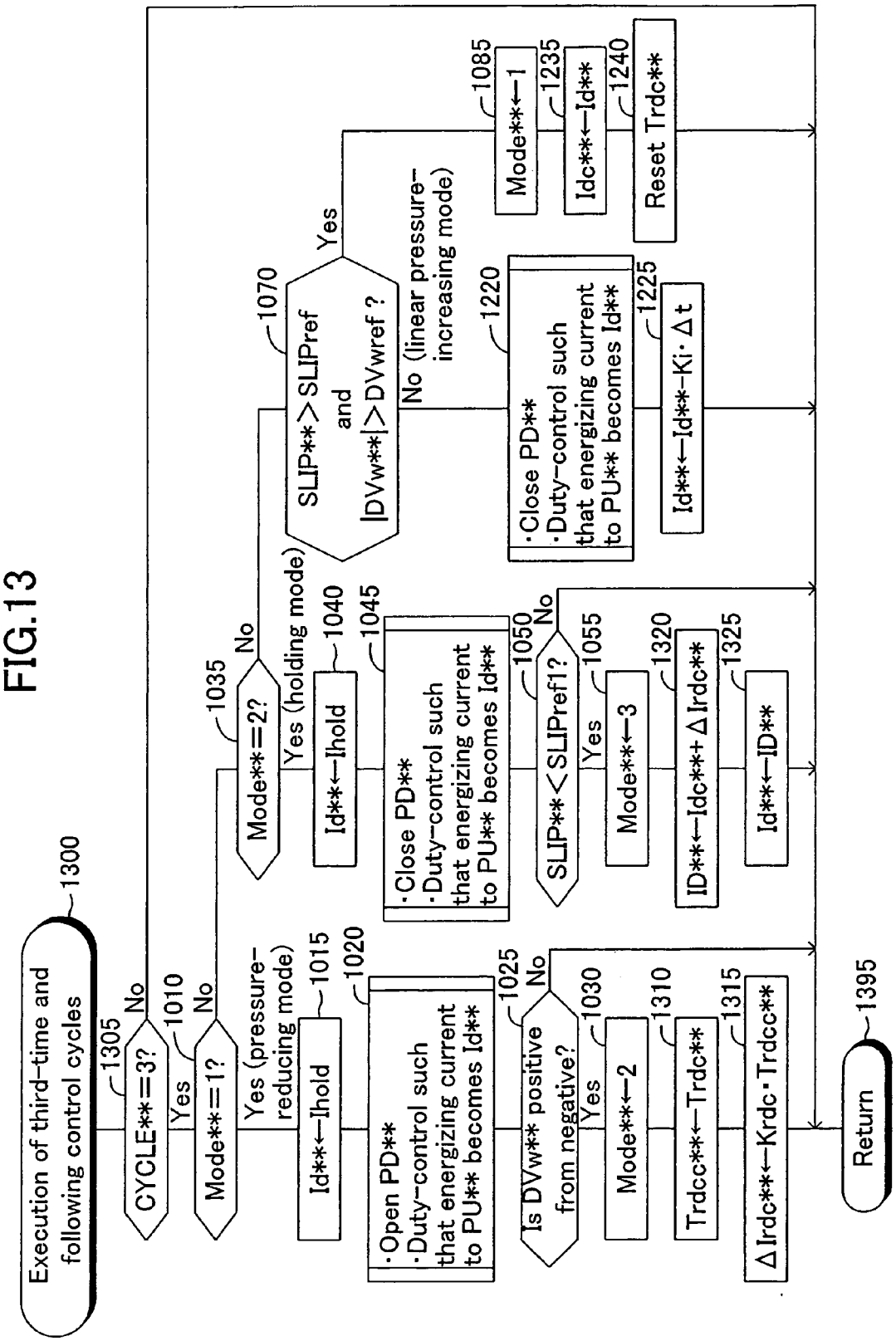
FIG. 13 is a flowchart showing a routine which the CPU shown in FIG. 1 executes in order to execute ABS control according to the third-time and the following control cycles.
Figure 14:
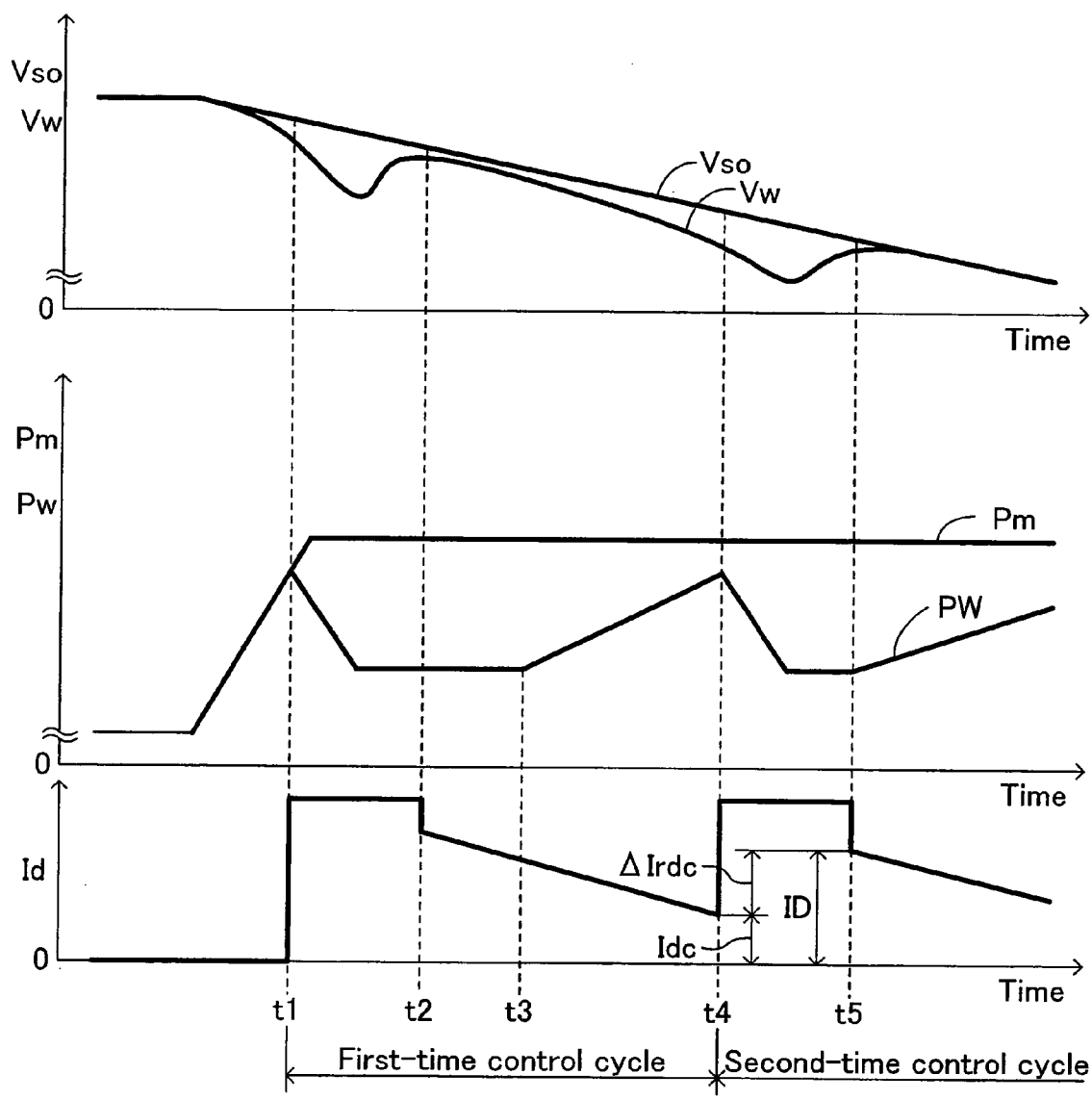
FIG. 14 is a time chart showing one example of a change in estimated vehicle body speed, wheel speed, master cylinder hydraulic pressure, wheel cylinder hydraulic pressure and command current value to the pressure-increasing valve that is the linear solenoid valve, in case where the ABS control is executed, with the actual differential pressure in the pressure-increasing control relatively small, by a brake hydraulic pressure control apparatus according to the background art.
Figure 15:
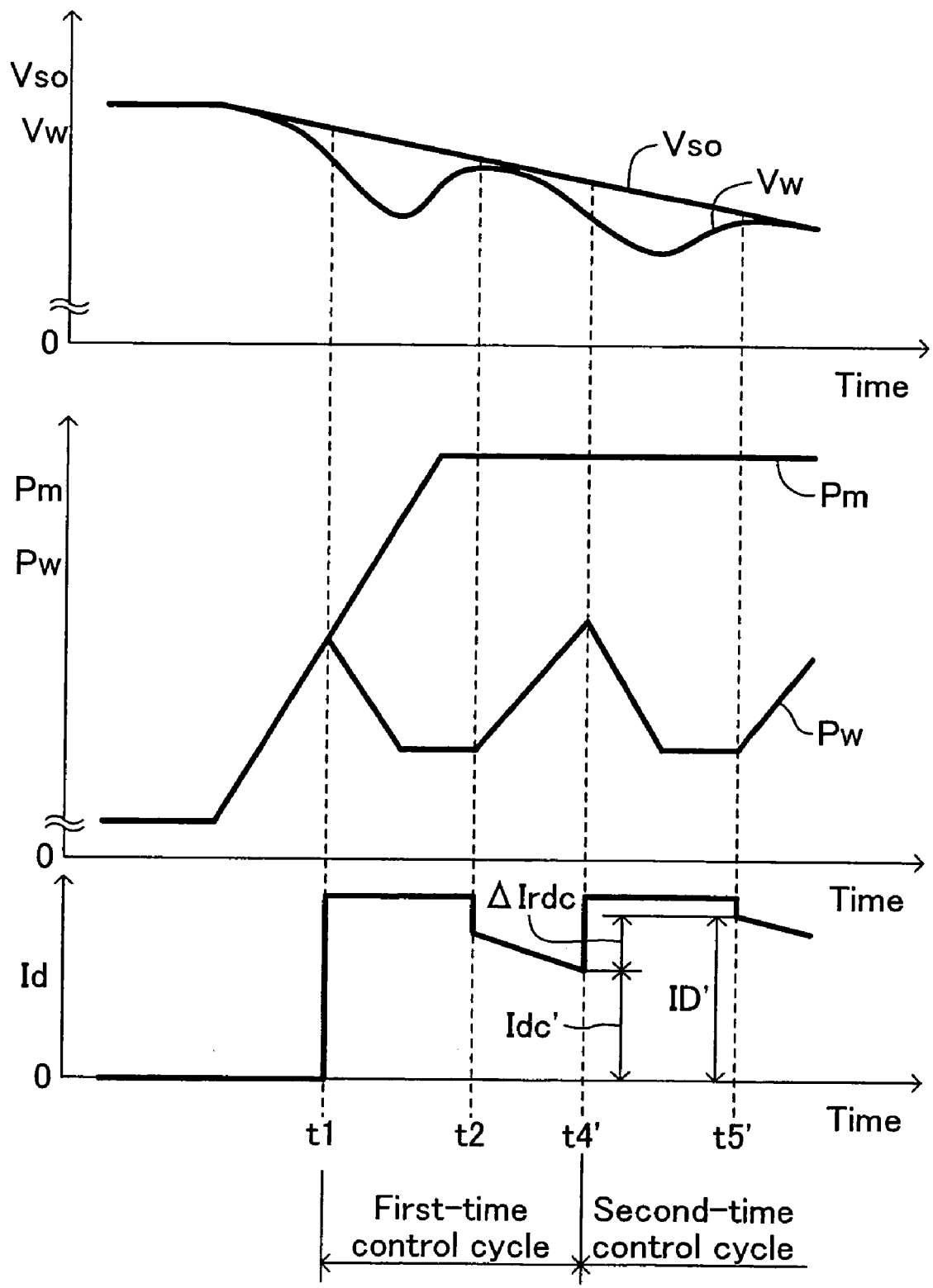
FIG. 15 is a time chart showing one example of a change in estimated vehicle body speed, wheel speed, master cylinder hydraulic pressure, wheel cylinder hydraulic pressure and command current value to the pressure-increasing valve that is the linear solenoid valve, in case where the ABS control is executed, with the actual differential pressure in the pressure-increasing control extremely great, by a brake hydraulic pressure control apparatus according to the background art.

Specifically, the CPU 51 repeatedly performs a routine shown in FIG. 13 executing the third-time and following control cycles at predetermined time intervals. Note that corresponding Step numbers same as those in FIG. 10 and FIG. 12 are given to Steps in FIG. 13 executing the same processing as that in FIG. 10 or FIG. 12, thereby omitting the detailed explanation thereof. Therefore, the explanation is made mainly for Steps specific to FIG. 13 hereinafter.

When a predetermined timing is reached, the CPU 51 starts processing of the routine from Step 1300, and proceeds to Step 1305 in order to determine whether the value of the variable CYCLE is "3". In case where the CPU 51 makes a "NO" determination, it immediately proceeds to Step 1395** to end the present routine.

The description will be continued on the assumption that the present stage is immediately after the third-time ABS control start conditions are satisfied and immediately after the value of the variable CYCLE is changed from "2" to "3" by the execution of the previous Step 1230 (see time t9 in FIG. 6). The CPU 51 makes a "YES" determination at Step 1305 and proceeds to Step 1010 where a "YES" determination is also made since the value of the variable Mode becomes "1" by the execution of the previous Step 1085.

As a result, like the case of the previous first-time and second-time control cycles, the pressure-reducing control for the wheel is executed until the condition (holding control start condition) at Step 1025 is satisfied (see the period from time t9 to time t10 in FIG. 6). When the holding control start condition is satisfied (see time t10 in FIG. 6), the CPU 51 makes a "YES" determination at Step 1025 and proceeds to Step 1030 to change the value of the variable Mode from "1" to "2".

Subsequently, the CPU 51 proceeds to Step 1310 to set the elapsed time Trdc at the present point (the continuation time of the pressure-reducing control in the third-time control cycle at the present point) as the control elapsed time Trdcc. At the successive Step 1315, the CPU 51 calculates the current value ΔIrdc corresponding to the reduced pressure according to the equation described in the box of Step 1315 and corresponding to the equation (2). After that, the holding control is executed for the wheel until the condition (pressure-increasing start condition) in Step 1050 is satisfied (see the period from time t10 to time t11 in FIG. 6).

When the pressure-increasing control start condition is satisfied, the CPU 51 makes a "YES" determination at Step 1050 and proceeds to Step 1055 to change the value of the variable Mode from "2" to "3". Thereafter, the CPU 51 proceeds to Step 1320 to store, as the current value ID corresponding to the actual differential pressure at the point of starting the linear pressure-increasing control, the sum of the current value Idc corresponding to the actual differential pressure at the point of starting the pressure-reducing control stored at the previous Step 1235 in FIG. 12 and the current value ΔIrdc corresponding to the reduced pressure calculated at the previous Step 1315. At the successive Step 1325, the CPU 51 sets the command current value Id to the stored ID. According to this, the command current value Id at the point of starting the linear pressure-increasing control in the third-time (and the following) control cycle (see time t11 in FIG. 6) agrees with the current value corresponding to the actual differential pressure at the same point.

After that, so long as the ABS control start conditions are again satisfied, the processing at Steps 1220 and 1225 is repeatedly executed, whereby the linear pressure-increasing control is executed in which the initial value of the command current value Id is set to the aforesaid ID. When the ABS control start conditions are again satisfied, the value of the variable Mode is again changed from "3" to "1", the command current value Id at the present point (i.e., at the point of ending the third-time pressure-increasing control) is stored as the current value Idc corresponding to the actual differential pressure at the point of starting the pressure-reducing control, and the elapsed time Trdc is reset. At this time, the value of the variable Mode is kept to be "3". As a result, the CPU 51 keeps on making a "YES" determination when proceeding to Step 1305, so that, like the third-time control cycle, the ABS control according to the fourth-time and following control cycles is accomplished by the execution of the routine shown in FIG. 13**.

As explained above, the operation of the CPU 51 can be executed so long as the ABS control end condition at Step 925 in the routine in FIG. 9 in which the processing at Steps 900, 905 and 925 is repeatedly executed is not satisfied. Accordingly, in case where the condition at Step 925 is satisfied such as the driver stops the operation on the brake pedal BP during the above-mentioned operation, the CPU 51 makes a "YES" determination at Step 925 and proceeds to Step 930 to change the value of the variable CYCLE to "0" from any one of "1" to "3". At the successive Step 935, all the solenoid valves (specifically, pressure-increasing valve PU and pressure-reducing valve PD**) are brought into their non-excited state. This ends the executed series of ABS control.

After that, the CPU 51 makes a "YES" determination when proceeding to Step 905 and again proceeds to Step 910 in order to monitor whether the ABS control start conditions are satisfied.

As explained above, the vehicle brake hydraulic pressure control apparatus according to the embodiment of the present invention adopts, as the pressure-increasing valve PU, a normally-open linear solenoid valve in which the energizing current value is linearly controlled by a duty control and adopts a normally-closed on-off solenoid valve as the pressure-reducing valve PD. Then, in principle, the present embodiment repeatedly executes the ABS control, in which pressure-reducing control, holding control and pressure-increasing control make one set, after the ABS control start conditions are satisfied and until the ABS control end conditions are satisfied. In this case, the pulse pressure-increasing control is executed instead of the linear pressure-increasing control only in the first-time ABS control. The present embodiment utilizes that the number of repeated times of the pulse pressure-increasing control can be a value representing the current value corresponding to the actual differential pressure at the point of starting the linear pressure-increasing control in the second-time ABS control, whereby the current value corresponding to the actual differential pressure at the same point is estimated based upon the number of repeated times, and the energizing current value to the pressure-increasing valve PU** at the same point is set to the estimated current value corresponding to the actual differential pressure at the same point.

According to this, the current value corresponding to the actual differential pressure at the point of starting the linear pressure-increasing control in the second-time ABS control can precisely be obtained, regardless of whether a driver performs a rapid and strong brake operation (i.e., whether the actual differential pressure in the first-time pressure-increasing control is extremely great), with the result that gentle pressure-increasing control of the wheel cylinder hydraulic pressure using the linear solenoid valve as the pressure-increasing valve can be started at an earlier stage (at the point of starting the second-time pressure-increasing control). Therefore, appropriate and gentle ABS control can be started at an earlier stage.

Further, when the value obtained by subtracting the slip amount SLIP(k−1) at the point of starting the pulse pressure-increasing control obtained last time from the slip amount SLIP(k) at the time of starting the pulse pressure-increasing control obtained this time is greater than the predetermined value ΔSLIPref during the repeated execution of the pulse pressure-increasing control, it is determined that the upgrade of the wheel cylinder hydraulic pressure in the pulse pressure-increasing control becomes extremely great, whereby the pulse cycle TC in this-time pulse pressure-increasing control is prolonged by the extension time ΔTC. According to this, in case where the upgrade of the wheel cylinder hydraulic pressure in the pulse pressure-increasing control becomes extremely great, the upgrade can be decreased toward the predetermined optimum value, and hence, the optimum pulse pressure-increasing control based upon the optimum upgrade of the wheel cylinder hydraulic pressure can be executed.

The present invention is not limited to the above-mentioned embodiment, and various modifications may be practiced without departing from the scope of the present invention. For example, in the above-mentioned embodiment, the table MapIC shown in FIG. 7 used for estimating the current value IC corresponding to the actual differential pressure at the point of starting the pressure-increasing control in the second-time ABS control is formed on the assumption that the reduced pressure amount (accordingly, the current value corresponding to the reduced pressure) of the wheel cylinder hydraulic pressure in the pressure-reducing control in the second-time ABS control is constant. However, the current value corresponding to the reduced pressure may be determined so as to be the value according to the pressure-reducing control continuation time, and the table MapIC may be corrected according to the determined current value corresponding to the reduced pressure. In this case, the current value IC corresponding to the actual differential pressure at the point of starting the pressure-increasing control is estimated from the corrected table MapIC and the value of the pulse pressure-increasing control times PULSE.

Further, in the above embodiment, the pulse cycle TC in the pulse pressure-increasing control obtained this time is prolonged by the extension time ΔTC only when the value obtained by subtracting the slip amount SLIP(k−1) at the point of starting the pulse pressure-increasing control obtained last time from the slip amount SLIP(k) at the time of starting the pulse pressure-increasing control obtained this time is greater than the predetermined value ΔSLIPref. However, the extension time ΔTC of the pulse cycle TC in this-time pulse pressure-increasing control may be changed according to the value obtained by subtracting SLIP(k−1) from SLIP(k).

What is claimed is:

1. A brake hydraulic pressure control apparatus that is applied to a control unit provided with
   a first linear solenoid valve disposed in a hydraulic circuit between a master cylinder, the master cylinder generating a master cylinder hydraulic pressure according to a brake operation by a driver, and a wheel cylinder, the first linear solenoid valve being configured to adjust a differential pressure between the master cylinder hydraulic pressure and a wheel cylinder hydraulic pressure according to a first energizing current value; and a second valve disposed in a hydraulic circuit between the wheel cylinder and a reservoir, the second valve being configured to be opened and closed in response to a second energizing current value, the brake hydraulic pressure control apparatus comprising:

control means for continuously executing plural times an anti-skid control, the anti-skid control comprising a pressure-increasing control for increasing the wheel cylinder hydraulic pressure which is executed after a pressure-reducing control for reducing the wheel cylinder hydraulic pressure is executed, by controlling the first and second energizing current values;

first obtaining means for causing, during the pressure-increasing control of a predetermined execution of the anti-skid control, the control means to continuously execute plural times a pulse pressure-increasing control for increasing and holding the wheel cylinder hydraulic pressure by controlling the first and second energizing current values, wherein during each pulse pressure-increasing control the first valve is maintained in its open state for a predetermined pressure-increasing time and then is maintained in its closed state for a predetermined pressure-holding time while the second valve is maintained in its closed state, the first obtaining means further obtaining the number of times the pulse pressure-increasing control is executed during the pressure-increasing control of the predetermined execution of the anti-skid control; and second obtaining means for obtaining a first value which is the first energizing current value corresponding to the differential pressure at a start of the execution of the pressure-increasing control of the anti-skid control that is executed immediately after the predetermined execution of the anti-skid control, the second obtaining means obtaining the first value based upon the number of times of the pulse pressure-increasing control is executed, wherein the control means sets the first energizing current value to the first value at the start of the pressure-increasing control of the anti-skid control that is executed immediately after the predetermined execution.

2. A brake hydraulic pressure control apparatus according to claim 1, wherein the predetermined execution of the anti-skid control is the first execution of the anti-skid control.

3. A brake hydraulic pressure control apparatus according to claim 1, further comprising:

holding time changing means for obtaining a second value representing a degree of increase in a slip amount of a wheel during the pulse pressure-increasing control, and for changing the predetermined pressure-holding time according to the second value.

4. A brake hydraulic pressure control apparatus according to claim 3, wherein the second value is a difference between the slip amount of the wheel at a start of one predetermined pressure-increasing time of the pulse pressure-increasing control and the slip amount of the wheel at a start of the next predetermined pressure-increasing time of the pulse pressure-increasing control.

5. A brake hydraulic pressure control apparatus according to claim 1, wherein the first valve is a normally-open linear solenoid valve.

6. A brake hydraulic pressure control apparatus according to claim 1, wherein the second valve is an on-off solenoid valve or a normally-closed linear solenoid valve.

7. A brake hydraulic pressure control apparatus, comprising:

a first linear solenoid valve configured to be disposed in a hydraulic circuit between a master cylinder, the master cylinder generating a master cylinder hydraulic pressure according to a brake operation by a driver, and a wheel cylinder, the first linear solenoid valve being configured to adjust a differential pressure between the master cylinder hydraulic pressure and a wheel cylinder hydraulic pressure according to a first energizing current value;

a second valve configured to be disposed in a hydraulic circuit between the wheel cylinder and a reservoir, the second valve being configured to be opened and closed in response to a second energizing current value;

control means for continuously executing plural times an anti-skid control, the anti-skid control comprising a pressure-increasing control for increasing the wheel cylinder hydraulic pressure which is executed after a pressure-reducing control for reducing the wheel cylinder hydraulic pressure is executed, by controlling the first and second energizing current values;

first obtaining means for causing, during the pressure-increasing control of a predetermined execution of the anti-skid control, the control means to continuously execute plural times a pulse pressure-increasing control for increasing and holding the wheel cylinder hydraulic pressure by controlling the first and second energizing current values, wherein during each pulse pressure-increasing control the first valve is maintained in its open state for a predetermined pressure-increasing time and then is maintained in its closed state for a predetermined pressure-holding time while the second valve is maintained in its closed state, the first obtaining means further obtaining the number of times the pulse pressure-increasing control is executed during the pressure-increasing control of the predetermined execution of the anti-skid control; and second obtaining means for obtaining a first value which is the first energizing current value corresponding to the differential pressure at a start of the execution of the pressure-increasing control of the anti-skid control that is executed immediately after the predetermined execution of the anti-skid control, the second obtaining means obtaining the first value based upon the number of times of the pulse pressure-increasing control is executed, wherein the control means sets the first energizing current value to the first value at the start of the pressure-increasing control of the anti-skid control that is executed immediately after the predetermined execution.

8. A brake hydraulic pressure control apparatus according to claim 7, wherein the predetermined execution of the anti-skid control is the first execution of the anti-skid control.

9. A brake hydraulic pressure control apparatus according to claim 7, further comprising:

holding time changing means for obtaining a second value representing a degree of increase in a slip amount of a wheel during the pulse pressure-increasing control, and for changing the predetermined pressure-holding time according to the second value.

10. A brake hydraulic pressure control apparatus according to claim 9, wherein the second value is a difference between the slip amount of the wheel at a start of one predetermined pressure-increasing time of the pulse pressure-increasing control and the slip amount of the wheel at a start of the next predetermined pressure-increasing time of the pulse pressure-increasing control.

11. A brake hydraulic pressure control apparatus according to claim 7, wherein the first valve is a normally-open linear solenoid valve.

12. A brake hydraulic pressure control apparatus according to claim 7, wherein the second valve is an on-off solenoid valve or a normally-closed linear solenoid valve.

* * * * *